(12) United States Patent
Sugita et al.

(10) Patent No.: US 9,431,673 B2
(45) Date of Patent: Aug. 30, 2016

(54) FUEL CELL

(75) Inventors: Narutoshi Sugita, Utsunomiya (JP);
Shuhei Goto, Utsunomiya (JP);
Kentaro Ishida, Utsunomiya (JP);
Tetsuya Nakamura, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 687 days.

(21) Appl. No.: 13/438,138

(22) Filed: Apr. 3, 2012

(65) Prior Publication Data
US 2012/0258378 A1 Oct. 11, 2012

(30) Foreign Application Priority Data
Apr. 7, 2011 (JP) .................................. 2011-085533

(51) Int. Cl.
| | | |
|---|---|---|
| H01M 8/04 | (2016.01) | |
| H01M 8/24 | (2016.01) | |
| H01M 8/02 | (2016.01) | |
| H01M 8/10 | (2016.01) | |

(52) U.S. Cl.
CPC ........... *H01M 8/242* (2013.01); *H01M 8/0267* (2013.01); *H01M 8/0273* (2013.01); *H01M 8/04029* (2013.01); *H01M 8/04089* (2013.01); *H01M 8/1004* (2013.01); *H01M 2008/1095* (2013.01); *Y02E 60/521* (2013.01)

(58) Field of Classification Search
CPC .................................. H01M 8/04; H01M 8/24
USPC .................................................. 429/456, 138
See application file for complete search history.

(56) References Cited

U.S. PATENT DOCUMENTS

| | | |
|---|---|---|
| 2005/0118486 A1 | 6/2005 | Strobel et al. |
| 2010/0055530 A1 | 3/2010 | Kawajiri et al. |
| 2010/0092836 A1 | 4/2010 | Saito et al. |
| 2010/0196774 A1 | 8/2010 | Kawabata et al. |
| 2011/0274999 A1 | 11/2011 | Mohri et al. |

FOREIGN PATENT DOCUMENTS

| | | | |
|---|---|---|---|
| DE | 102 03 612 C1 | | 6/2003 |
| DE | 103 43 766 A1 | | 6/2005 |
| DE | 10343766 A1 | * | 6/2005 |
| DE | 11 2008 000 567 T5 | | 1/2010 |
| JP | 2003187853 A | * | 7/2003 |

(Continued)

OTHER PUBLICATIONS

Chinese Office Action dated Jan. 30, 2014, issued over the corresponding Chinese Patent Application No. 201210099721.3 with the English translation of pertinent portion.

*Primary Examiner* — Daniel Gatewood
(74) *Attorney, Agent, or Firm* — Carrier Blackman & Associates, P.C.; William D. Blackman; Joseph P. Carrier

(57) ABSTRACT

A cell unit of a fuel cell includes a first membrane electrode assembly, a first metal separator, a second membrane electrode assembly, and a second metal separator. A resin frame member is provided integrally with an outer circumference of the first membrane electrode assembly. An oxygen-containing gas supply passage, a fuel gas supply passage, a coolant supply passage, an oxygen-containing gas discharge passage, a fuel gas discharge passage, and a coolant discharge passage extend through the resin frame member in a stacking direction. At each of both ends of the resin frame member in a longitudinal direction, a pair of projections are provided. The projections protrude toward both sides in a lateral direction.

8 Claims, 29 Drawing Sheets

(56) References Cited

FOREIGN PATENT DOCUMENTS

| JP | 2007-294243 | A |   | 11/2007 |
| JP | 2007294243 | A | * | 11/2007 |
| JP | 2008-293736 | A |   | 12/2008 |
| JP | 2009-123596 | A |   | 6/2009 |
| JP | 2009123596 | A | * | 6/2009 |
| JP | 2011-018525 | A |   | 1/2011 |
| WO | 2010/082589 | A1 |   | 7/2010 |

* cited by examiner

FUEL CELL

CROSS-REFERENCE TO RELATED APPLICATION

This application is based upon and claims the benefit of priority from Japanese Patent Application No. 2011-085533 filed on Apr. 7, 2011, of which the contents are incorporated herein by reference.

BACKGROUND OF THE INVENTION

1. Field of the Invention

The present invention relates to a fuel cell formed by stacking a rectangular electrolyte electrode assembly and a metal separator. The electrolyte electrode assembly includes a pair of electrodes and an electrolyte interposed between the electrodes.

2. Description of the Related Art

For example, a solid polymer electrolyte fuel cell employs a membrane electrode assembly (electrolyte electrode assembly) (MEA) which includes an anode, a cathode, and a solid polymer electrolyte membrane interposed between the anode and the cathode. The solid polymer electrolyte membrane is a polymer ion exchange membrane. Each of the anode and the cathode includes an electrode catalyst layer and a porous carbon layer. The membrane electrode assembly and separators (bipolar plates) sandwiching the membrane electrode assembly make up a unit cell. In use, generally, a predetermined number of unit cells are stacked together to form a fuel cell stack mounted in a vehicle.

In general, the fuel cell adopts so called internal manifold structure where supply passages and discharge passages extend through separators in a stacking direction. The fuel gas, the oxygen-containing gas, and the coolant are supplied from the respective supply passages respectively to a fuel gas flow field, an oxygen-containing gas flow field and a coolant flow field along electrode surfaces, and then, the fuel gas, the oxygen-containing gas and the coolant are discharged into the respective discharge passages.

For example, a fuel cell disclosed in Japanese Laid-Open Patent Publication No. 2011-018525 has a stack structure formed by stacking a membrane electrode assembly and a separator. A seal is formed integrally with the membrane electrode assembly. The separator includes an anode plate, a cathode plate and an intermediate plate. As shown in FIG. 29, the anode plate has a laterally elongated rectangular plate.

A fuel gas flow field 1 including a plurality of flow grooves 1a is formed in a surface of the anode plate. At one end of the long side of the anode plate, an oxygen-containing gas discharge passage 2b, a coolant supply passage 3a and a fuel gas supply passage 4a are arranged vertically, and at the other end of the long side of the anode plate, a fuel gas discharge passage 4b, a coolant discharge passage 3b and an oxygen-containing gas supply passage 2a are arranged vertically.

The fuel gas supply passage 4a and the fuel gas discharge passage 4b, and the fuel gas flow field 1 are connected by through holes 5a, 5b. Though not shown, the cathode plate and the intermediate plate have the same structure as the anode plate.

SUMMARY OF THE INVENTION

In each of the separators, the oxygen-containing gas discharge passage 2b, the coolant supply passage 3a, the fuel gas supply passage 4a, the fuel gas discharge passage 4b, the coolant discharge passage 3b, and the oxygen-containing gas supply passage 2a are formed at both ends of reactant gas flow field (or coolant flow field) such as the fuel gas flow field 1.

In the structure, the surface area of the separator is considerably large. In particular, when a metal separator is used, the amount of expensive material such as stainless steel for producing the metal separator becomes large, and the unit cost for the component becomes high. Further, in the separator, three through holes are formed in each of both ends in the longitudinal direction, and the through holes are arranged in the width direction indicated by the arrow H. In the structure, the dimension of the separator in the direction indicated by the arrow H is considerably large. Therefore, the width cannot be reduced easily.

The present invention has been made to solve the problem of this type, and an object of the present invention is to provide a fuel cell which is capable of suitably reducing the size of relatively expensive metal separators and effectively reducing the width of the fuel cell.

The present invention relates to a fuel cell formed by stacking a rectangular electrolyte electrode assembly and a metal separator in a stacking direction. The electrolyte electrode assembly includes a pair of electrodes and an electrolyte interposed between the electrodes.

In the fuel cell, a resin frame member is formed integrally with an outer circumference of the electrolyte electrode assembly. A reactant gas supply passage, a reactant gas discharge passage, a coolant supply passage and a coolant discharge passage extend through the resin frame member in the stacking direction outside the metal separator. A pair of projections are provided at each of both ends of the resin frame member in a longitudinal direction, and the projections protrude toward both sides in a lateral direction.

In the present invention, the resin frame member is provided around the electrolyte electrode assembly, and the fluid passages extend through the resin frame member in the stacking direction outside of, and spaced apart from the metal separator. In the structure, no fluid passages are required in the metal separator. Thus, reduction in the size and weight of the metal separator can be achieved easily. Accordingly, it becomes possible to reduce the production cost of the metal separator, and the metal separator can be produced efficiently.

Further, in the electrolyte electrode assembly, the pair of projections are provided at each of both ends of the resin frame member in the longitudinal direction, and the projections protrude in the lateral direction. Thus, since recesses are formed between the projections, tightening plates, cell voltage detection terminals or the like can be placed in the recesses. In the structure, the overall size of the fuel cell can be reduced easily, and the fuel cell can be mounted in a vehicle conveniently.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
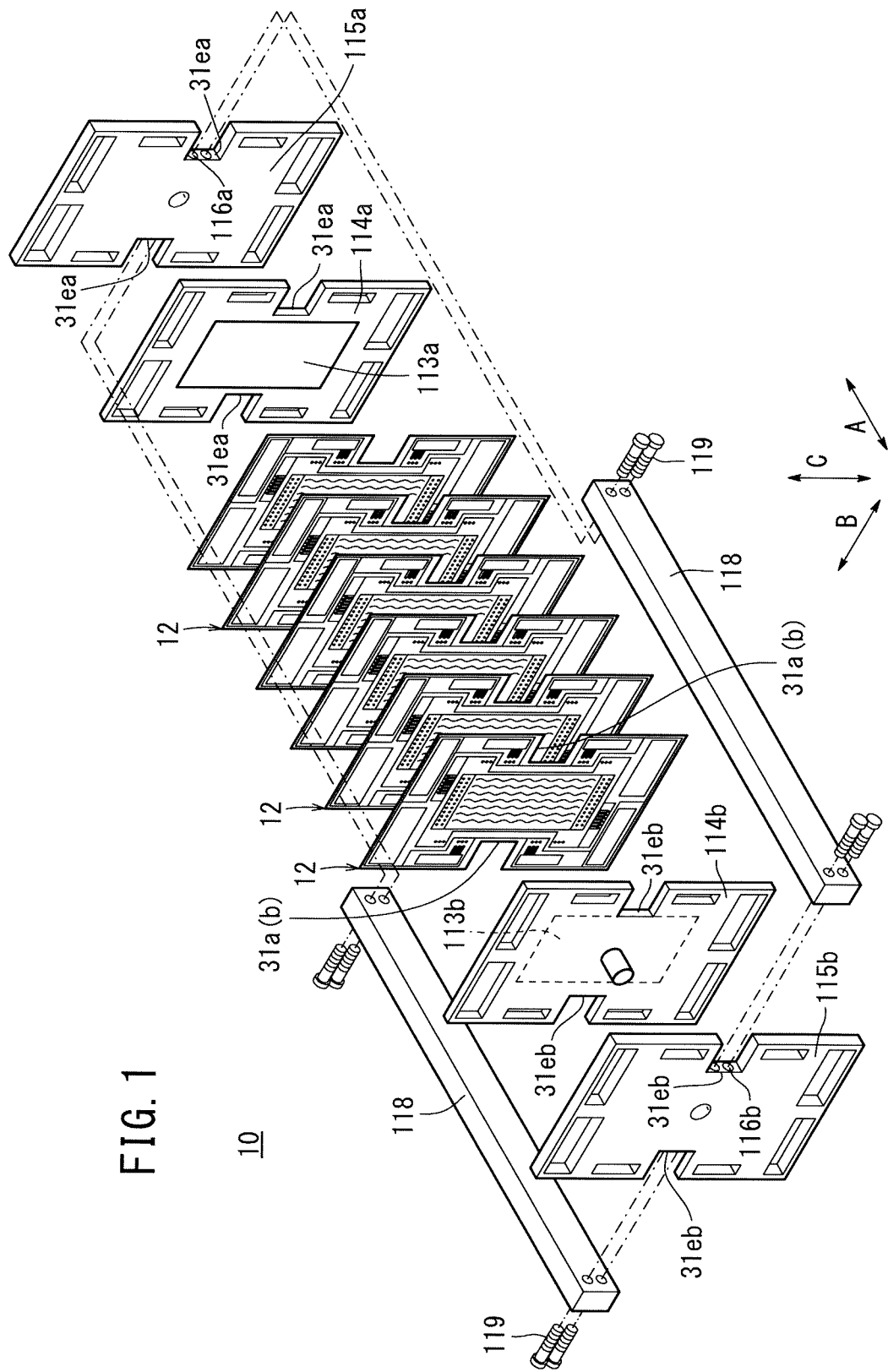
FIG. 1 is a perspective view schematically showing a fuel cell according to a first embodiment of the present invention.

As shown in FIG. 1, a fuel cell 10 according to a first embodiment of the present invention is formed by stacking a plurality of cell units 12 in a horizontal direction indicated by an arrow A.

Figure 2:
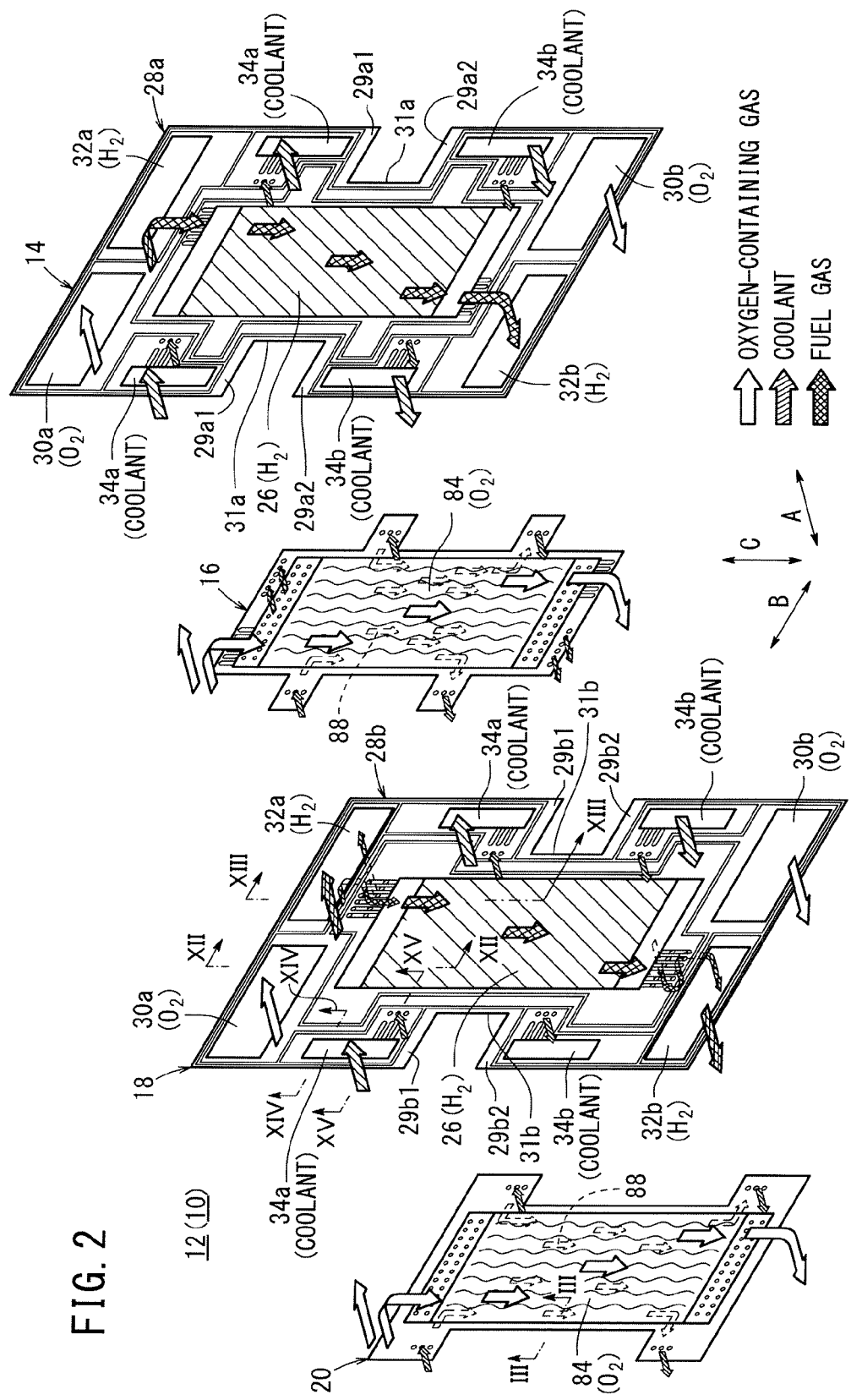
FIG. 2 is an exploded perspective view showing the fuel cell.
Figure 3:
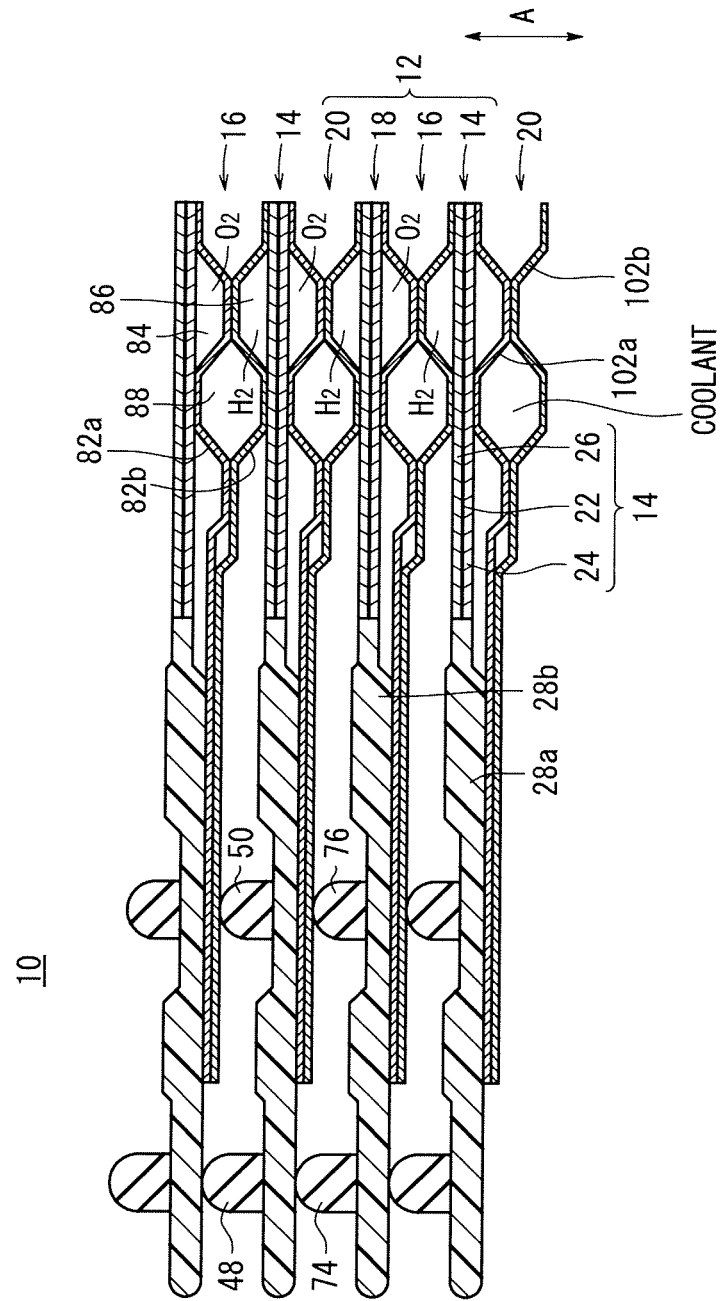
FIG. 3 is a cross sectional view showing the fuel cell, taken along a line III-III in FIG. 2.

As shown in FIGS. 2 and 3, the cell unit 12 includes a rectangular first membrane electrode assembly (electrolyte electrode assembly) (MEA) 14, a first metal separator 16, a rectangular second membrane electrode assembly (electrolyte electrode assembly) (MEA) 18, and a second metal separator 20. By stacking the cell units 12, the first membrane electrode assembly 14 is sandwiched between the second and first metal separators 20, 16, and the second membrane electrode assembly 18 is sandwiched between the first and second metal separators 16, 20.

Each of the first membrane electrode assembly 14 and the second membrane electrode assembly 18 includes a cathode 24, an anode 26, and a solid polymer electrolyte membrane (electrolyte) 22 interposed between the cathode 24 and the anode 26 (see FIG. 3). The solid polymer electrolyte membrane 22 is formed by impregnating a thin membrane of perfluorosulfonic acid with water, for example.

In the solid polymer electrolyte membrane 22, the surface area of the cathode 24 and the surface area of the anode 26 are the same. It should be noted that the outer circumferential portion of the solid polymer electrolyte membrane 22 may protrude beyond the cathode 24 and the anode 26. The surface area of the cathode 24 may be different from the surface area of the anode 26.

In the first membrane electrode assembly 14, a frame (resin frame member) 28a made of insulating polymer material is formed integrally with the outer circumferential edges of the solid polymer electrolyte membrane 22, the cathode 24 and the anode 26, e.g., by injection molding. Likewise, in the second membrane electrode assembly 18, a frame (resin frame member) 28b made of polymer material is formed integrally with the outer circumferential edges of the solid polymer electrolyte membrane 22, the cathode 24 and the anode 26, e.g., by injection molding. For example, engineering plastics and super engineering plastics as well as commodity plastics may be adopted as the polymer material.

Figure 4:
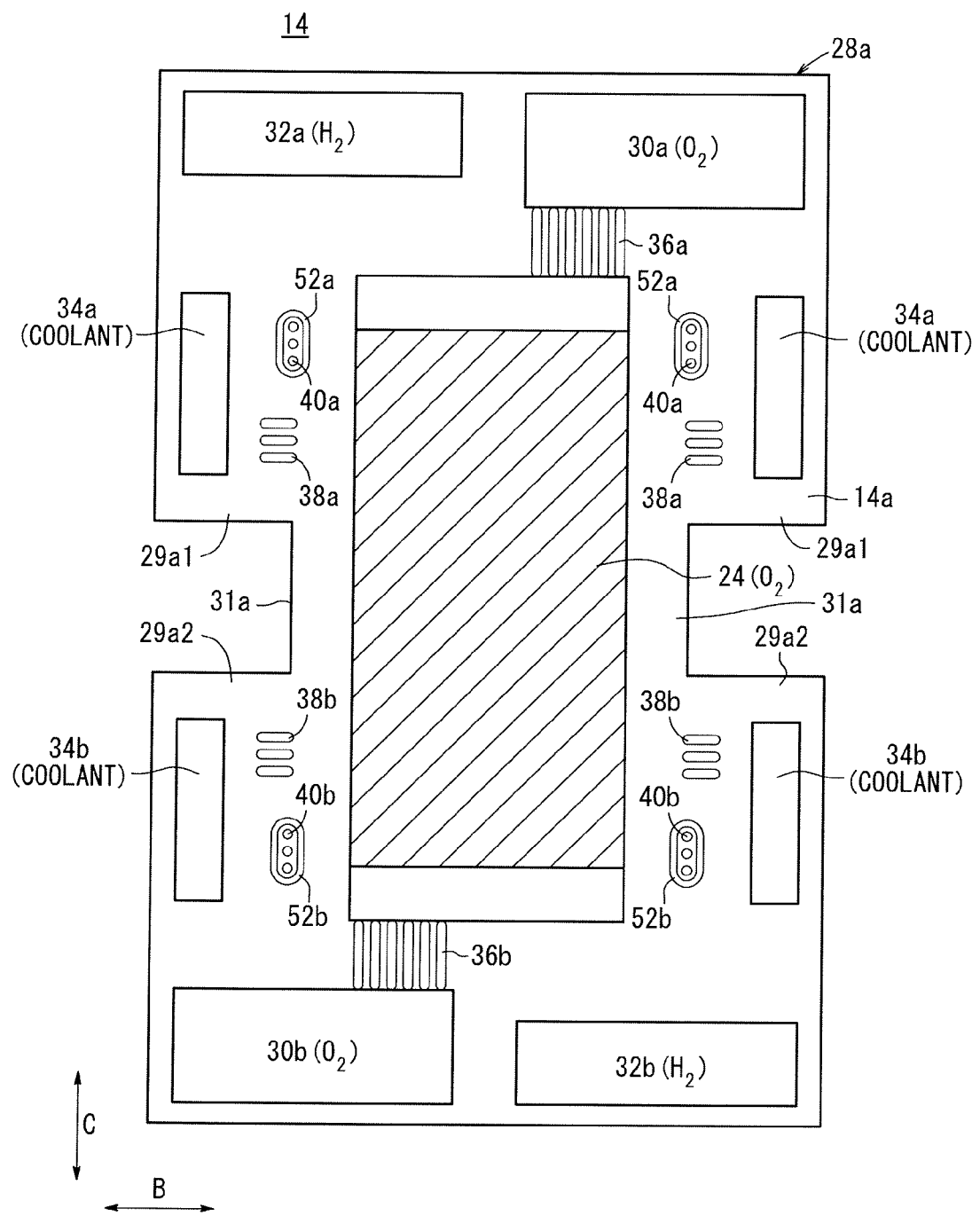
FIG. 4 is a view showing a cathode surface of a first membrane electrode assembly of the fuel cell.
Figure 5:
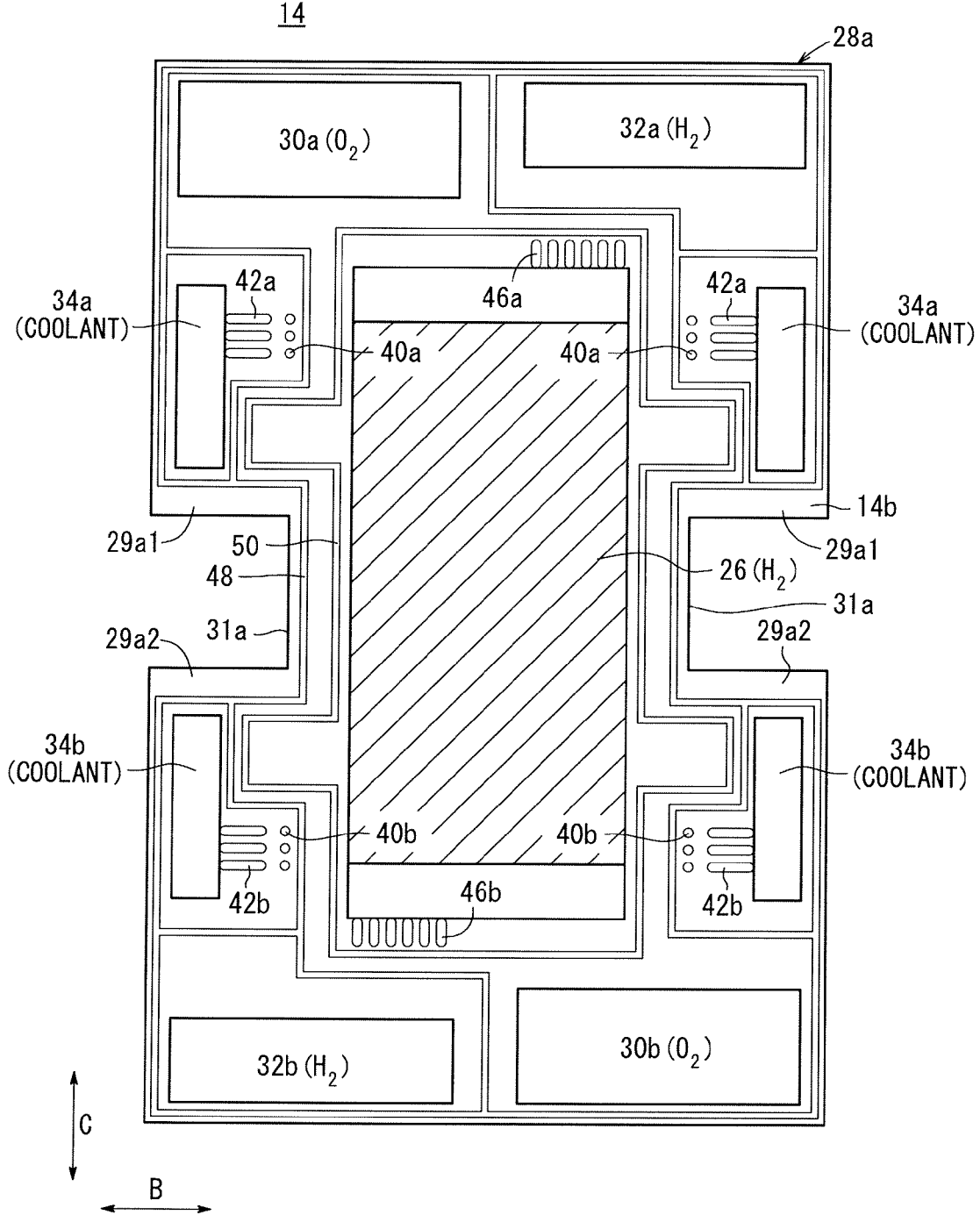
FIG. 5 is a view showing an anode surface of the first membrane electrode assembly.

As shown in FIGS. 2 and 4-5, the frame 28a has a substantially rectangular shape elongated in a direction indicated by an arrow C. As shown in the drawings, the resin frame member 28a includes a pair of opposed shorter sides having edge portions which are substantially flat and uninterrupted, and also includes a pair of longer sides. A pair of lateral projections 29a1, 29a2 are provided at each end of the frame 28a, respectively, in a longitudinal direction indicated by the arrow C. The projections 29a1, 29a2 protrude toward both sides in a lateral direction indicated by the arrow B. Rectangular recesses 31a are formed between one of the projections 29a1 and the other of the projections 29a2, respectively on each of the two long sides of the frame 28a.

The frame 28b has a substantially rectangular shape elongated in the direction indicated by the arrow C. A pair of lateral projections 29b1, 29b2 are provided at each end of the frame 28b, respectively, in the longitudinal direction indicated by the arrow C. The projections 29b1, 29b2 protrude toward both sides in the lateral direction indicated by the arrow B. Rectangular recesses 31b are formed between one of the projections 29b1 and the other of the projections 29b2, respectively on each of the two long sides of the frame 28b.

Each of the cathode 24 and the anode 26 has a gas diffusion layer (not shown) such as a carbon paper, and an electrode catalyst layer (not shown) of platinum alloy supported on porous carbon particles. The carbon particles are deposited uniformly on the surface of the gas diffusion layer.

As shown in FIG. 2, at one end (upper end) of the frames 28a, 28b in a vertical direction indicated by an arrow C, an oxygen-containing gas supply passage 30a for supplying an oxygen-containing gas (reactant gas) and a fuel gas supply passage 32a for supplying a fuel gas (reactant gas) such as a hydrogen-containing gas are arranged in a horizontal direction in a direction indicated by an arrow B.

At the other end (lower end) of the frames 28a, 28b in the vertical direction indicated by the arrow C, a fuel gas discharge passage 32b for discharging the fuel gas and an oxygen-containing gas discharge passage 30b for discharging the oxygen-containing gas are arranged in the direction indicated by the arrow B.

At upper positions at both ends of the frames 28a, 28b in the direction indicated by the arrow B, a pair of coolant supply passages 34a for supplying a coolant are provided, and at lower positions at both ends of the frames 28a, 28b in the direction indicated by the arrow B, a pair of coolant discharge passages 34b for discharging the coolant are provided. The coolant supply passages 34a and the coolant discharge passages 34b extend through the frames 28a, 28b in the direction indicated by the arrow A.

The coolant supply passages 34a are positioned adjacent to the oxygen-containing gas supply passage 30a and the fuel gas supply passage 32a, separately on the sides (other pair of sides) at both ends in the direction indicated by the arrow B. The coolant discharge passages 34b are positioned adjacent to the oxygen-containing gas discharge passage 30b and the fuel gas discharge passage 32b, separately on the sides at both ends in the direction indicated by the arrow B.

In the frames 28a, 28b, when a coolant flow field 88 as described later is divided into an upper part and a lower part with an intermediate position of the coolant flow field 88 in the flow direction indicated by the arrow C being regarded as a border between the upper part and the lower part of the coolant flow field 88, the coolant supply passages 34a are positioned on the upper part on the upstream side of the coolant flow field 88 while the coolant discharge passages 34b are positioned on the lower part on the downstream side of the coolant flow field 88.

The coolant supply passages 34a and the coolant discharge passages 34b may be provided upside down. That is, the coolant supply passages 34a may be positioned adjacent to the oxygen-containing gas discharge passage 30b and the fuel gas discharge passage 32b.

In the first and second membrane electrode assemblies 14, 18, on one pair of opposite sides, i.e., on both of upper and lower short sides, the oxygen-containing gas supply passage 30a and the fuel gas supply passage 32a, and the oxygen-containing gas discharge passage 30b and the fuel gas discharge passage 32b are provided, and on the other pair of opposite sides, i.e., on both of left and right long sides, the pair of coolant supply passages 34a and the pair of coolant discharge passages 34b are provided.

As shown in FIG. 4, the frame 28a has a plurality of inlet grooves 36a at upper positions of the cathode surface (the surface where the cathode 24 is provided) 14a of the first membrane electrode assembly 14 and adjacent to the lower side of the oxygen-containing gas supply passage 30a. Further, the frame 28a has a plurality of inlet grooves 38a at upper positions at both ends of the cathode surface 14a in the width direction indicated by the arrow B and adjacent to the lower side of the coolant supply passages 34a. A plurality of inlet holes 40a extend through the frame 28a at positions adjacent to the upper side of the coolant supply passages 34a.

The frame 28a has a plurality of outlet grooves 36b at lower positions of the cathode surface 14a of the first membrane electrode assembly 14 and adjacent to the upper side of the oxygen-containing gas discharge passage 30b. Further, the frame 28a has a plurality of outlet grooves 38b at lower positions at both ends of the cathode surface 14a in the width direction and adjacent to the upper side of the coolant discharge passages 34b. A plurality of outlet holes 40b extend through the frame 28a at positions adjacent to the lower side of the coolant discharge passages 34b.

As shown in FIG. 5, the frame 28a has a plurality of inlet grooves 42a at upper positions on both ends of the anode surface (the surface where the anode 26 is provided) 14b of the first membrane electrode assembly 14 in the width direction and adjacent to the upper side of the coolant supply passages 34a. The frame 28a has a plurality of outlet grooves 42b at lower positions on both ends of the anode surface 14b in the width direction and adjacent to lower portions of the coolant discharge passages 34b.

The frame 28a has a plurality of inlet grooves 46a below the fuel gas supply passage 32a, and a plurality of outlet grooves 46b above the fuel gas discharge passage 32b.

An outer seal member (outer seal line) 48 and an inner seal member (inner seal line) 50 are provided integrally with the anode surface 14b of the frame 28a. Alternatively, the outer seal member 48 and the inner seal member 50 may be formed separately from the frame 28a, and provided on the anode surface 14b of the frame 28a. Each of the outer seal member 48 and the inner seal member 50 is made of seal material, cushion material or packing material such as an EPDM rubber (ethylene propylene diene monomer), an NBR (nitrile butadiene rubber), a fluoro rubber, a silicone rubber, a fluorosilicone rubber, a butyl rubber, a natural rubber, a styrene rubber, a chloroprene rubber, or an acrylic rubber. Seal members as described later have the same structure as those of the outer seal member 48 and the inner seal member 50, and description thereof will be omitted.

The outer seal member 48 is provided along the outer circumferential end of the frame 28a and around all of the fluid passages, i.e., the oxygen-containing gas supply passage 30a, the coolant supply passages 34a, the fuel gas supply passage 32a, the oxygen-containing gas discharge passage 30b, the coolant discharge passages 34b and the fuel gas discharge passage 32b and around the reaction surface (power generation surface). The outer seal member 48 surrounds respectively the coolant supply passages 34a, the fuel gas supply passage 32a, the coolant discharge passages 34b and the fuel gas discharge passage 32b. The outer seal member 48 surrounds the inlet grooves 42a, the inlet holes 40a and the coolant supply passages 34a together, and surrounds the outlet grooves 42b, the outlet holes 40b and the coolant discharge passages 34b together.

The inner seal member 50 is positioned inside the outer seal member 48, and surrounds the anode 26, the inlet grooves 46a and the outlet grooves 46b together. The inner seal member 50 is provided along a profile line corresponding to the outer shape of the first metal separator 16, and contacts the entire outer circumferential surface of the first metal separator 16 (within the separator surface). The outer seal member 48 is provided around the outer circumferential end of the first metal separator 16 (outside the separator surface). All of the fluid passages are hermetically surrounded by the outer seal member 48 and the inner seal member 50.

As shown in FIG. 4, on the cathode surface 14a of the frame 28a, a ring-shaped inlet seal member 52a surrounding the inlet holes 40a and a ring-shaped outlet seal member 52b surrounding the outlet holes 40b are provided.

Figure 6:
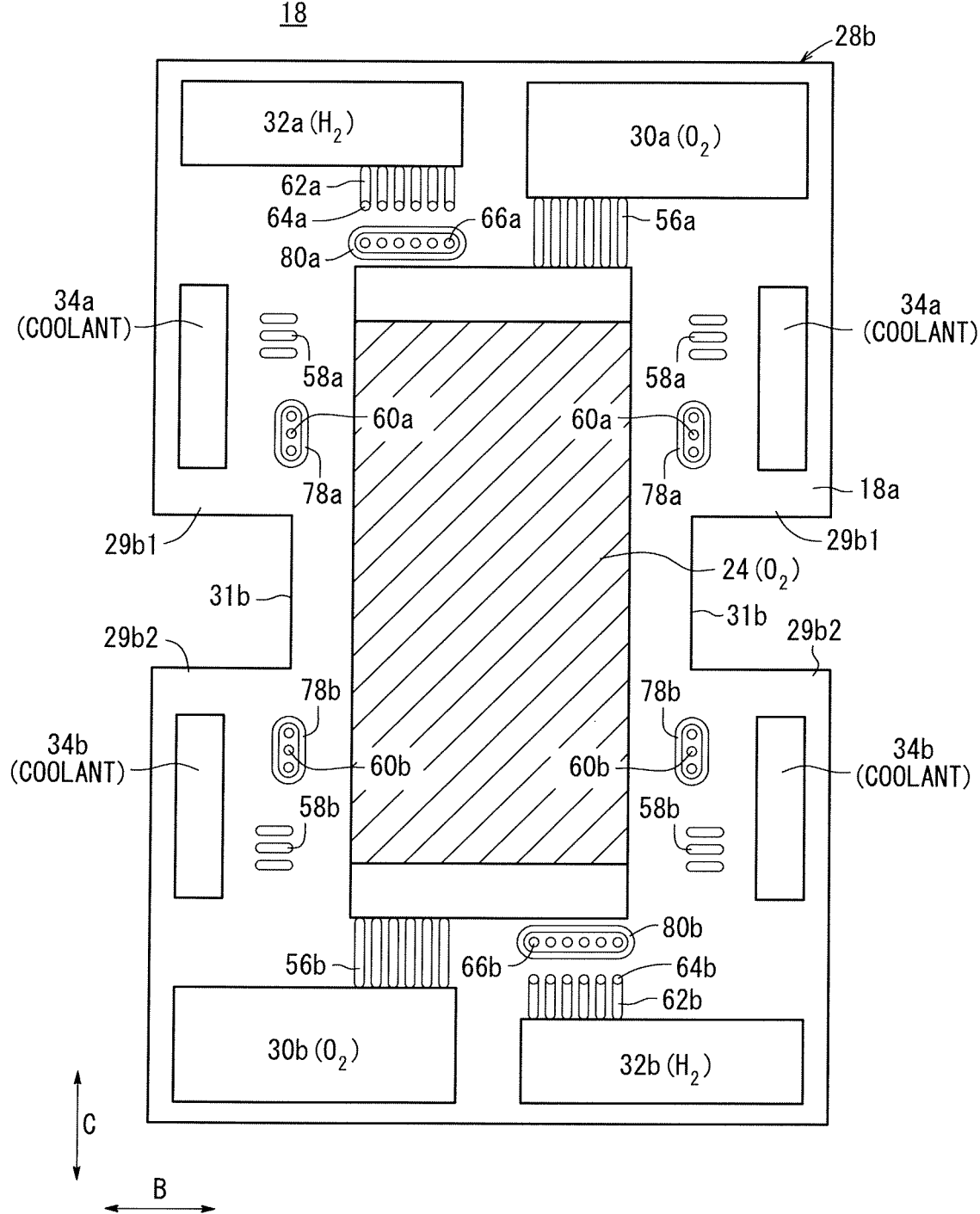
FIG. 6 is a view showing a cathode surface of a second membrane electrode assembly of the fuel cell.

As shown in FIG. 6, the frame 28b has a plurality of inlet grooves 56a at upper positions of the cathode surface (the surface where the cathode 24 is provided) 18a of the second membrane electrode assembly 18 and adjacent to the lower side of the oxygen-containing gas supply passage 30a.

The frame 28b has a plurality of inlet grooves 58a at upper positions on both ends of the cathode surface 18a in the width direction and adjacent to the upper side of the coolant supply passages 34a. A plurality of inlet holes 60a are formed adjacent to the lower side of the coolant supply passages 34a. The inlet holes 60a of the second membrane electrode assembly 18 are offset from the inlet holes 40a of the first membrane electrode assembly 14 such that the inlet holes 60a and the inlet holes 40a are not overlapped with each other in the stacking direction.

The frame 28b has a plurality of inlet grooves 62a at upper positions of the cathode surface 18a and adjacent to the lower side of the fuel gas supply passage 32a. A plurality of inlet holes 64a extend through the frame 28b at the lower ends of the inlet grooves 62a. A plurality of inlet holes 66a extend through the frame 28b below the inlet holes 64a and at positions spaced at predetermined distances from the inlet holes 64a.

The frame 28b has a plurality of outlet grooves 58b at lower positions on both ends of the cathode surface 18a in the width direction and adjacent to the lower side of the coolant discharge passages 34b. A plurality of outlet holes 60b are formed adjacent to the upper side of the coolant discharge passages 34b. The outlet holes 60b of the second membrane electrode assembly 18 are offset from the outlet holes 40b of the first membrane electrode assembly 14 such that the outlet holes 60b and the outlet holes 40b are not overlapped with each other in the stacking direction.

The frame 28b has a plurality of outlet grooves 62b at lower positions of the cathode surface 18a and adjacent to the upper side of the fuel gas discharge passage 32b. A plurality of outlet holes 64b extend through the frame 28b at the upper ends of the outlet grooves 62b. A plurality of outlet holes 66b extend through the frame 28b above the outlet holes 64b and at positions spaced at predetermined distances from the outlet holes 64b.

Figure 7:
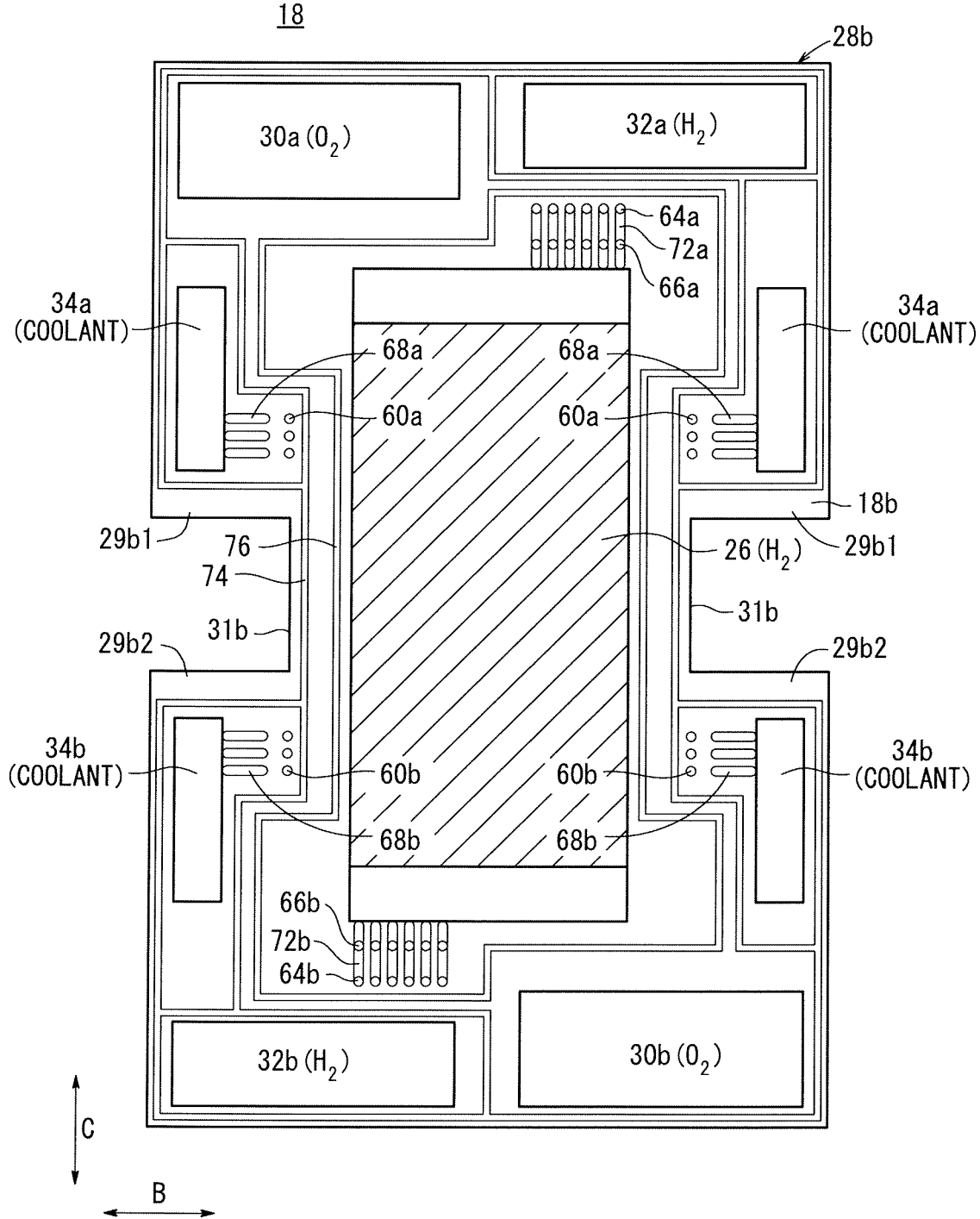
FIG. 7 is a view showing an anode surface of the second membrane electrode assembly.

As shown in FIG. 7, the frame 28b has a plurality of inlet grooves 68a at upper positions on both sides of the anode surface (the surface where the anode 26 is provided) 18b of the second membrane electrode assembly 18 in the width direction and adjacent to the lower side of the coolant supply passages 34a. The frame 28b has a plurality of inlet grooves 72a below the fuel gas supply passage 32a. The inlet grooves 72a connect the inlet holes 64a, 66a with each other.

The frame 28b has a plurality of outlet grooves 68b at lower positions on both ends of the anode surface 18b in the width direction and adjacent to the upper side of the coolant discharge passages 34b. The frame 28b has a plurality of outlet grooves 72b above the fuel gas discharge passage 32b. The outlet grooves 72b connect the outlet holes 64b, 66b with each other.

An outer seal member (outer seal line) 74 and an inner seal member (inner seal line) 76 are provided integrally with the anode surface 18b of the frame 28b. Alternatively, the outer seal member 74 and the inner seal member 76 may be formed separately from the frame 28b, and provided on the anode surface 18b of the frame 28b. The outer seal member 74 is provided along the outer circumferential end of the frame 28b and around all of the fluid passages, i.e., the oxygen-containing gas supply passage 30a, the coolant supply passages 34a, the fuel gas supply passage 32a, the oxygen-containing gas discharge passage 30b, the coolant discharge passages 34b and the fuel gas discharge passage 32b.

The outer seal member 74 surrounds the coolant supply passages 34a, the fuel gas supply passage 32a, the coolant discharge passages 34b and the fuel gas discharge passage 32b. The outer seal member 74 surrounds the inlet grooves 68a, the inlet holes 60a and the coolant supply passages 34a together, and surrounds the outlet grooves 68b, the outlet holes 60b and the coolant discharge passages 34b together.

The inner seal member 76 is positioned inside the outer seal member 74, and surrounds the anode 26, the inlet holes 64a, 66a, the inlet grooves 72a, the outlet holes 64b, 66b and the outlet grooves 72b together. The inner seal member 76 is provided along a profile line corresponding to the outer shape of the second metal separator 20, and contacts the entire outer circumferential surface of the second metal separator 20. The outer seal member 74 is provided around the second metal separator 20. All of the fluid passages are hermetically surrounded by the outer seal member 74 and the inner seal member 76.

As shown in FIG. 6, on the cathode surface 18a of the frame 28b, ring-shaped inlet seal members 78a, 80a surrounding the inlet holes 60a, 66a and ring-shaped outlet seal members 78b, 80b surrounding the outlet holes 60b, 66b are provided.

As shown in FIGS. 8-11, the first and second metal separators 16, 20 are dimensioned and arranged in the fuel cell 10 such that the first and second metal separators 16, 20 are provided inwardly of, and spaced away from the oxygen-containing gas supply passage 30a, the coolant supply passages 34a, the fuel gas supply passage 32a, the oxygen-containing gas discharge passage 30b, the coolant discharge passages 34b and the fuel gas discharge passage 32b (all of the fluid passages).

As shown in FIG. 3, the first metal separator 16 includes two metal plates (e.g., stainless plates) 82a, 82b having the same outer shape. The metal plates 82a, 82b are stacked together. The outer circumferential edges of the metal plates 82a, 82b are welded or bonded together, and the internal space between the metal plates 82a, 82b is closed hermetically. An oxygen-containing gas flow field 84 facing the cathode 24 is formed on the metal plate 82a, and a fuel gas flow field 86 facing the anode 26 is formed on the metal plate 82b. A coolant flow field 88 is formed between the metal plates 82a, 82b.

Figure 8:
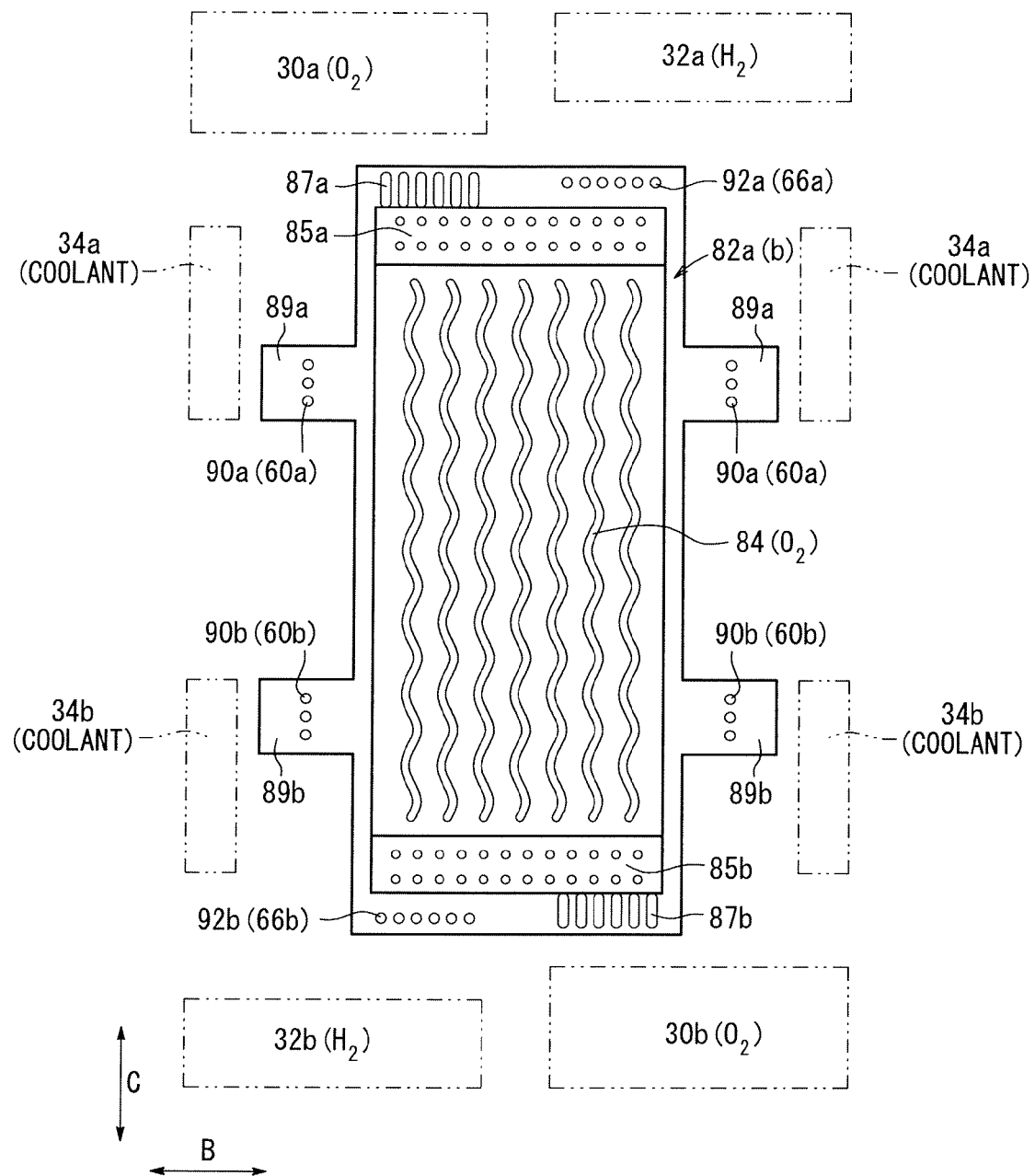
FIG. 8 is a view showing a cathode surface of a first metal separator of the fuel cell.

As shown in FIG. 8, the first metal separator 16 has the oxygen-containing gas flow field 84 in a surface of the metal plate 82a, and which includes a plurality of wavy flow grooves extending in the vertical direction indicated by the arrow C. An inlet buffer 85a is provided on the upstream side of the oxygen-containing gas flow field 84, and an outlet buffer 85b is provided on the downstream side of the oxygen-containing gas flow field 84. A plurality of inlet grooves 87a are formed above the inlet buffer 85a and below the oxygen-containing gas supply passage 30a, and a plurality of outlet grooves 87b are formed below the outlet buffer 85b and above the oxygen-containing gas discharge passage 30b.

The first metal separator 16 has a rectangular shape elongated in a direction indicated by an arrow C. At both ends in a lateral direction indicated by an arrow B, a pair of projections 89a protruding toward lower portions of the coolant supply passages 34a, and a pair of projections 89b protruding toward upper portions of the coolant discharge passages 34b are provided. In the metal plate 82a, a plurality of holes 90a are formed in the projections 89a, and the holes 90a are connected to the inlet holes 60a of the second membrane electrode assembly 18. Further, in the metal plate 82a, a plurality of holes 90b are formed in the projections 89b, and the holes 90b are connected to the outlet holes 60b of the second membrane electrode assembly 18.

A plurality of holes 92a are formed at upper positions of the metal plate 82a, and the holes 92a are connected to the inlet holes 66a of the second membrane electrode assembly 18. A plurality of holes 92b are formed at lower positions of the metal plate 82a, and the holes 92b are connected to the outlet holes 66b of the second membrane electrode assembly 18. The holes 92a, 92b are also formed in the metal plate 82b, and extend through the first metal separator 16.

Figure 9:
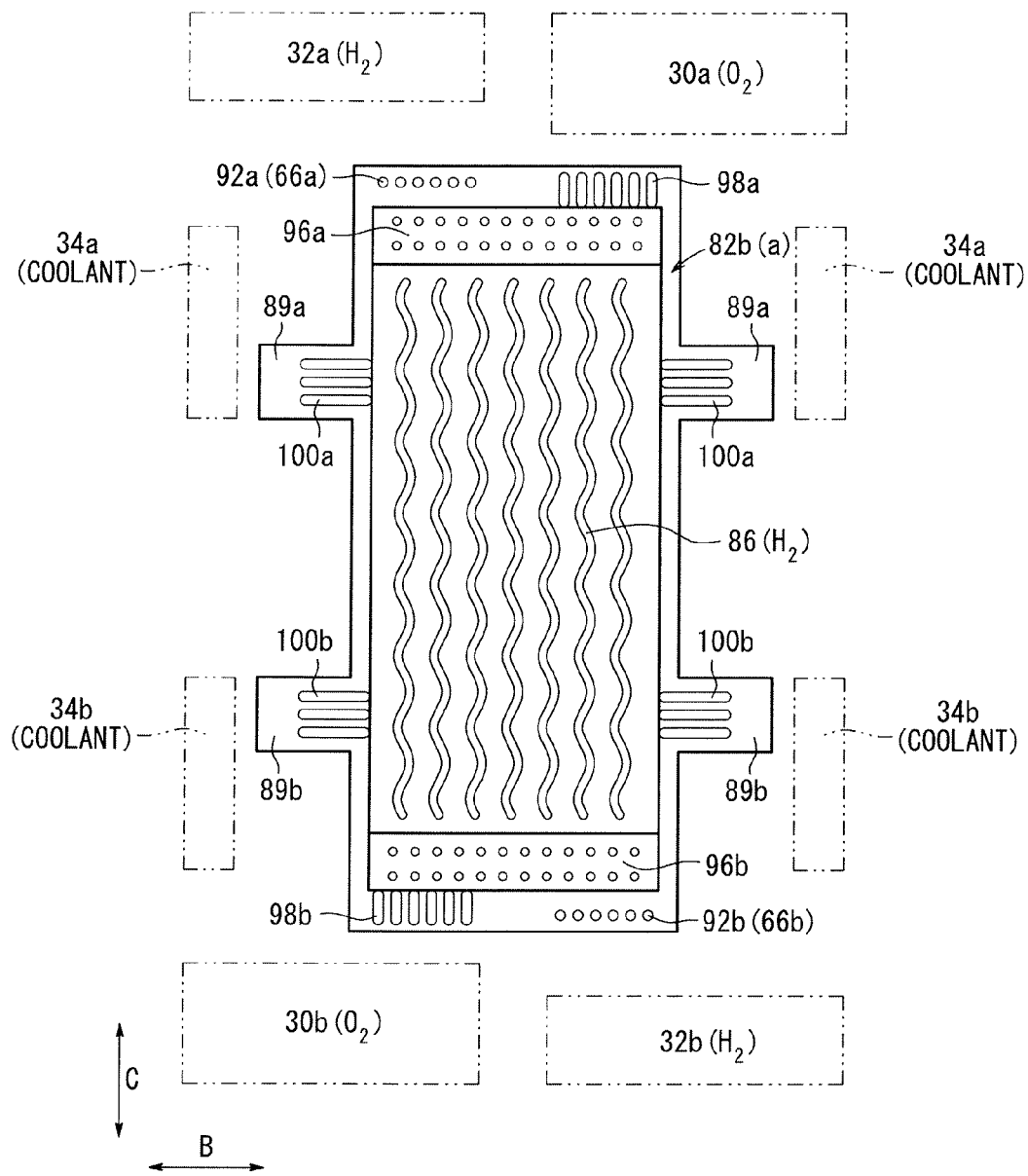
FIG. 9 is a view showing an anode surface of the first metal separator.

As shown in FIG. 9, the first metal separator 16 has the fuel gas flow field 86 in a surface of the metal plate 82b and which includes a plurality of wavy flow grooves extending in a vertical direction indicated by the arrow C. An inlet buffer 96a is provided on the upstream side of the fuel gas flow field 86, and an outlet buffer 96b is provided on the downstream side of the fuel gas flow field 86. A plurality of inlet grooves 98a are formed above the inlet buffer 96a and below the oxygen-containing gas supply passage 30a, and a plurality of outlet grooves 98b are formed below the outlet buffer 96b and above the oxygen-containing gas discharge passage 30b.

A plurality of inlet grooves 100a are formed in the projections 89a and adjacent to the lower portions of the coolant supply passages 34a. A plurality of outlet grooves 100b are formed in the projections 89b and adjacent to the upper portions of the coolant discharge passages 34b.

As shown in FIG. 3, the second metal separator 20 includes two metal plates (e.g., stainless plates) 102a, 102b having the same outer shape. The metal plates 102a, 102b are stacked together. The outer circumferential edges of the metal plates 102a, 102b are welded or bonded together, and the internal space between the metal plates 102a, 102b is closed hermetically. An oxygen-containing gas flow field 84 facing the cathode 24 is formed on the metal plate 102a, and a fuel gas flow field 86 facing the anode 26 is formed on the metal plate 102b. A coolant flow field 88 is formed between the metal plates 102a, 102b.

Figure 10:
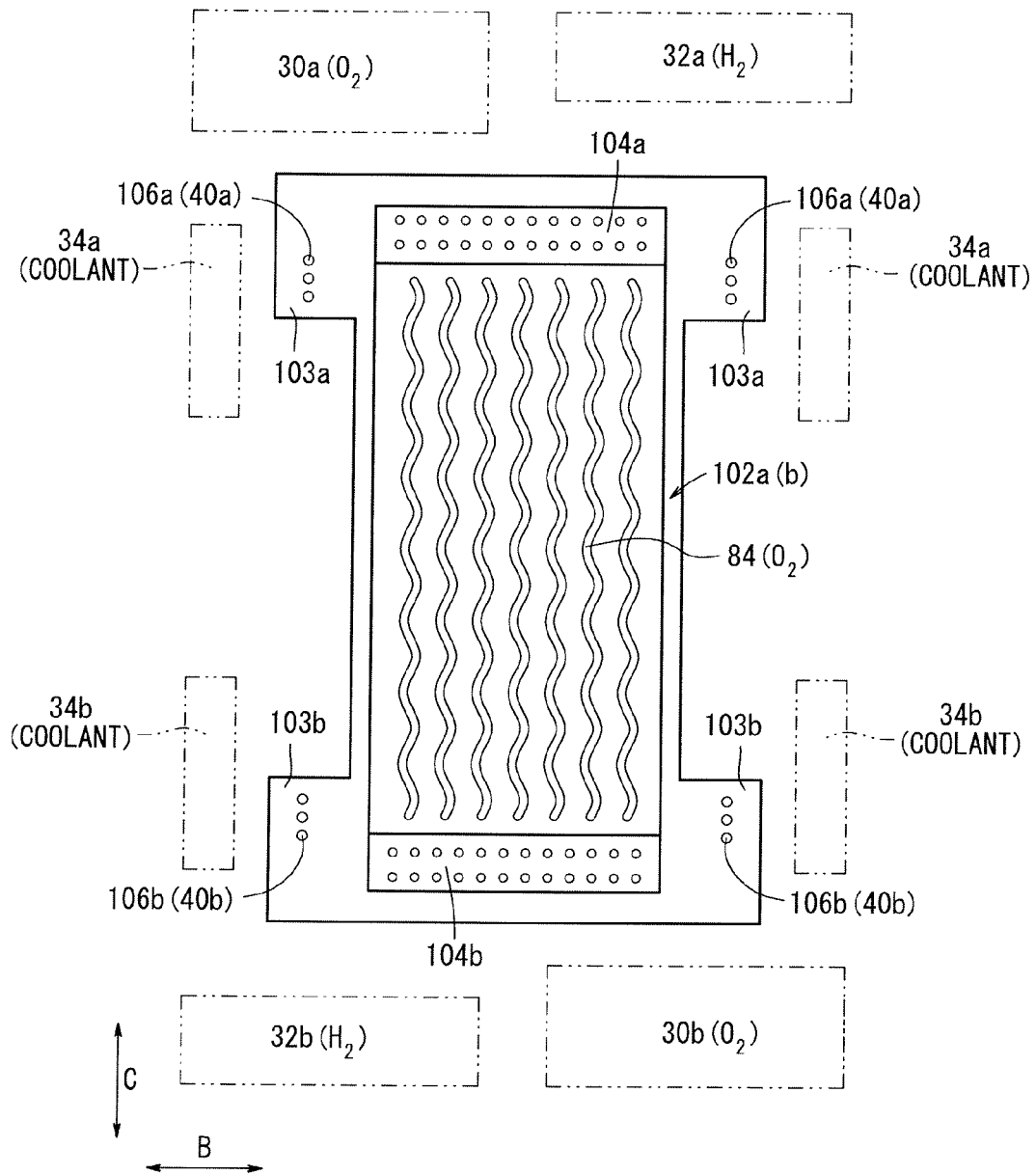
FIG. 10 is a view showing a cathode surface of a second metal separator of the fuel cell.

As shown in FIG. 10, the second metal separator 20 has pairs of projections 103a, 103b at both ends in the direction indicated by the arrow C. The projections 103a, 103b protrude outwardly in the direction indicated by the arrow B. The oxygen-containing gas flow field 84 is provided in the surface of the metal plate 102a. The oxygen-containing gas flow field 84 includes a plurality of flow grooves extending in the vertical direction indicated by the arrow C. An inlet buffer 104a is provided on the upstream side of the oxygen-containing gas flow field 84, and an outlet buffer 104b is provided on the downstream side of the oxygen-containing gas flow field 84.

In the metal plate 102a, a plurality of holes 106a are formed in the projections 103b and adjacent to upper portions of the coolant supply passages 34a. The holes 106a are connected to the inlet holes 40a of the first membrane electrode assembly 14. Further, in the metal plate 102a, a plurality of holes 106b are formed in the projections 103b and adjacent to lower portions of the coolant discharge passages 34b. The holes 106b are connected to the outlet holes 40b of the first membrane electrode assembly 14.

The inlet holes 40a and the holes 106a of the frame 28a and the inlet holes 60a and the holes 90a of the frame 28b are not overlapped with each other in the stacking direction.

Figure 11:
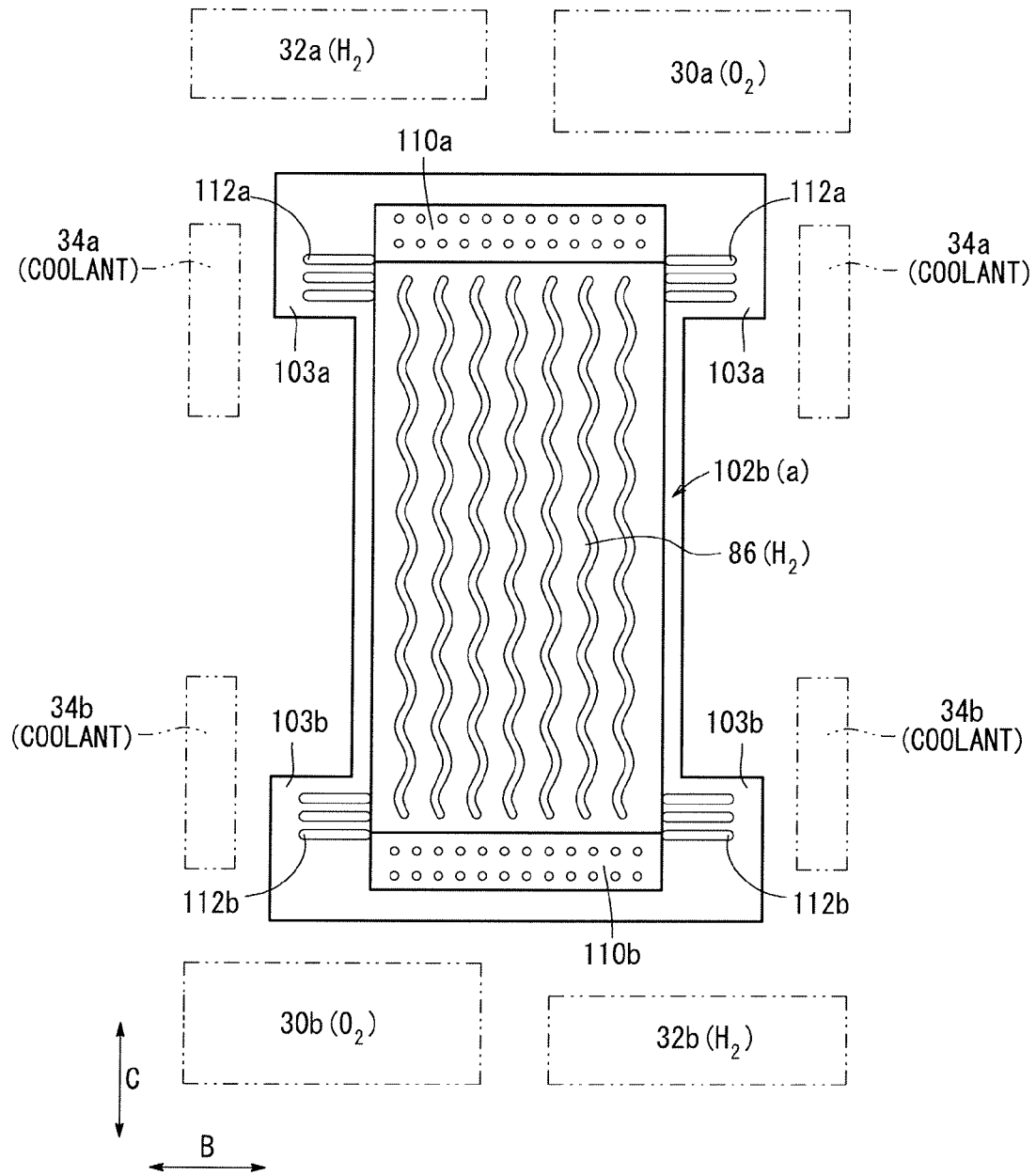
FIG. 11 is a view showing an anode surface of the second metal separator.

As shown in FIG. 11, the second metal separator 20 has the fuel gas flow field 86 in a surface of the metal plate 102b. The fuel gas flow field 86 includes a plurality of flow grooves extending in the vertical direction indicated by the arrow C. An inlet buffer 110a is provided on the upstream side of the fuel gas flow field 86, and an outlet buffer 110b is provided on the downstream side of the fuel gas flow field 86.

A plurality of inlet grooves 112a are formed in the projections 103a of the metal plate 102b and adjacent to the upper side of the coolant supply passages 34a, and a plurality of outlet grooves 112b are formed in the projections 103b of the metal plate 102b and adjacent to the lower side of the coolant discharge passages 34b. Both of the inlet grooves 112a and the outlet grooves 112b have corrugated structure to form coolant channels in the second metal separator 20.

As shown in FIG. 1, at one end of a plurality of cell units 12 in the stacking direction, an insulating plate 114a containing a terminal plate 113a is provided, and an end plate 115a is provided outside the insulating plate 114a. At the other end of the plurality of cell units 12 in the stacking direction, an insulating plate 114b containing a terminal plate 113b is provided, and an end plate 115b is provided outside the insulating plate 114b.

Recesses 31ea corresponding to the recesses 31a, 31b of the frames 28a, 28b are formed on both long sides of the insulating plate 114a and the end plate 115a. The end plate 115a has a plurality of screw holes 116a in inner wall surfaces of the recess 31ea.

Recesses 31eb corresponding to the recesses 31a, 31b of the frames 28a, 28b are formed on both long sides of the insulating plate 114b and the end plate 115b. The end plate 115b has a plurality of screw holes 116b in inner wall surfaces of the recess 31eb.

Tightening members, e.g., a pair of tightening plates (plate members) 118 extend through the recesses 31a, 31b of the cell units 12, the recesses 31ea of the insulating plate 114a and the end plate 115a, and the recesses 31eb of the insulating plate 114b and the end plate 115b in the stacking direction. In the embodiment, though the tightening plate 118 has a rectangular bar shape elongated in the direction indicated by the arrow A, the tightening plate 118 may have various shapes, such as a semi-circular column shape or a polygonal shape.

At both ends of each of the tightening plates 118, screw members 119 are screwed into the screw holes 116a, 116b formed in the inner wall surfaces of the recesses 31ea, 31eb of the end plates 115a, 115b. Thus, the tightening plates 118 and the end plates 115a, 115b are fixed together. The tightening plates 118 are placed in the recesses 31a, 31b, 31ea and the recess 31eb. Therefore, the tightening plates 118 are not exposed to the outside from the long sides.

Operation of this fuel cell 10 will be described below.

As shown in FIG. 2, an oxygen-containing gas is supplied to the oxygen-containing gas supply passage 30a, and a fuel gas such as a hydrogen-containing gas is supplied to the fuel gas supply passage 32a. Further, a coolant such as pure water, ethylene glycol or the like is supplied to the pair of coolant supply passages 34a.

Figure 12:
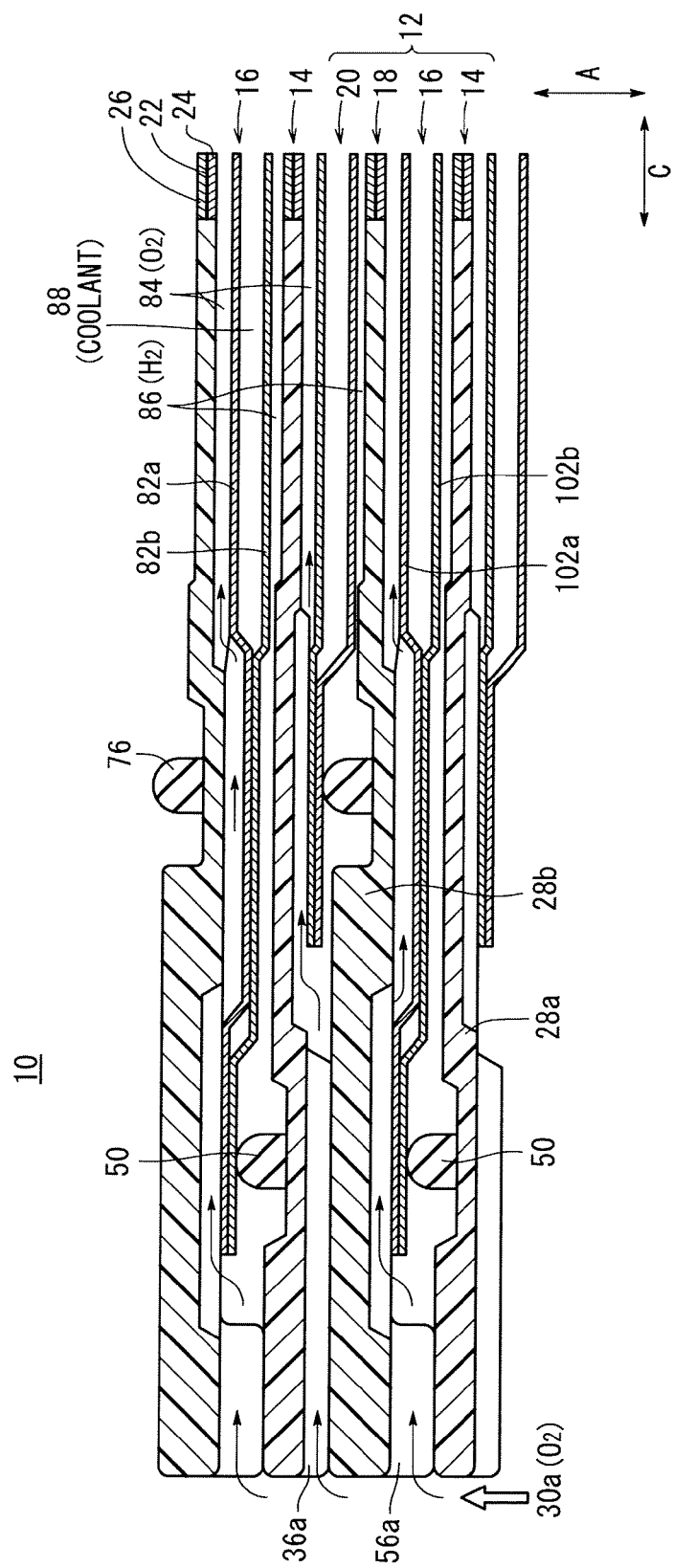
FIG. 12 is a cross sectional view showing the fuel cell, taken along a line XII-XII in FIG. 2.

In each of the cell units 12, as shown in FIGS. 2 and 12, the oxygen-containing gas supplied to the oxygen-containing gas supply passage 30a flows into the inlet grooves 36a of the first membrane electrode assembly 14 and into the inlet grooves 56a of the second membrane electrode assembly 18.

The oxygen-containing gas from the inlet grooves 36a is supplied to the oxygen-containing gas flow field 84 of the second metal separator 20. Then, the oxygen-containing gas is supplied from the oxygen-containing gas flow field 84 to the cathode 24 of the first membrane electrode assembly 14. After the oxygen-containing gas is consumed in the power generation reaction, the remaining oxygen-containing gas is discharged through the outlet grooves 36b into the oxygen-containing gas discharge passage 30b.

In the meanwhile, the oxygen-containing gas from the inlet grooves 56a flows through the inlet grooves 87a between the second membrane electrode assembly 18 and the first metal separator 16, and then, the oxygen-containing gas is supplied to the oxygen-containing gas flow field 84 of the first metal separator 16. The oxygen-containing gas from the oxygen-containing gas flow field 84 is supplied to the cathode 24 of the second membrane electrode assembly 18. After the oxygen-containing gas is consumed in the power generation reaction, the remaining oxygen-containing gas is discharged through the outlet grooves 87b, 56b into the oxygen-containing gas discharge passage 30b.

Figure 13:
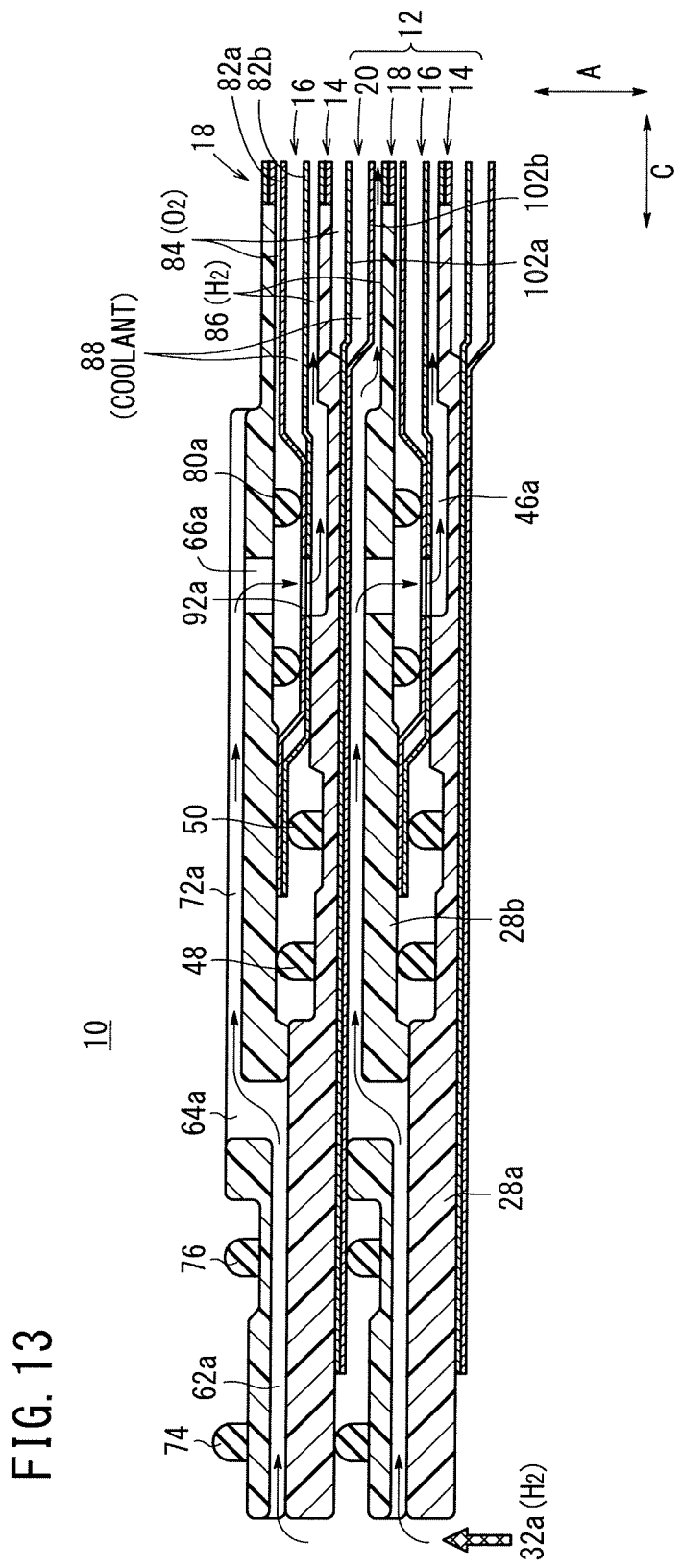
FIG. 13 is a cross sectional view showing the fuel cell, taken along a line XIII-XIII in FIG. 2.

Further, as shown in FIGS. 2 and 13, the fuel gas supplied to the fuel gas supply passage 32a flows into the inlet grooves 62a at the cathode 24 of the second membrane electrode assembly 18. The fuel gas from the inlet grooves 62a moves toward the anode 26 through the inlet holes 64a, and then, the fuel gas is partially supplied from the inlet grooves 72a to the fuel gas flow field 86 of the second metal separator 20.

The remaining fuel gas flows through the inlet holes 66a and the holes 92a of the first metal separator 16, and then, flows into between the first metal separator 16 and the first membrane electrode assembly 14. Thereafter, the fuel gas is supplied to the fuel gas flow field 86 of the first metal separator 16.

After the fuel gas is consumed in the power generation reaction in the fuel gas flow field 86 of the second metal separator 20, the fuel gas is discharged into the outlet grooves 72b. Then, the fuel gas is discharged from the outlet holes 64b through the outlet grooves 62b into the fuel gas discharge passage 32b. In the meanwhile, after the fuel gas is consumed in the power generation reaction in the fuel gas flow field 86 of the first metal separator 16, the fuel gas is discharged from the holes 92b through the outlet holes 66b into the outlet grooves 72b. Then, likewise, the fuel gas is discharged into the fuel gas discharge passage 32b.

Thus, in each of the first membrane electrode assembly 14 and the second membrane electrode assembly 18, the oxygen-containing gas supplied to the cathode 24 and the fuel gas supplied to the anode 26 are consumed in electrochemical reactions at catalyst layers of the cathode 24 and the anode 26 for generating electricity.

Figure 14:
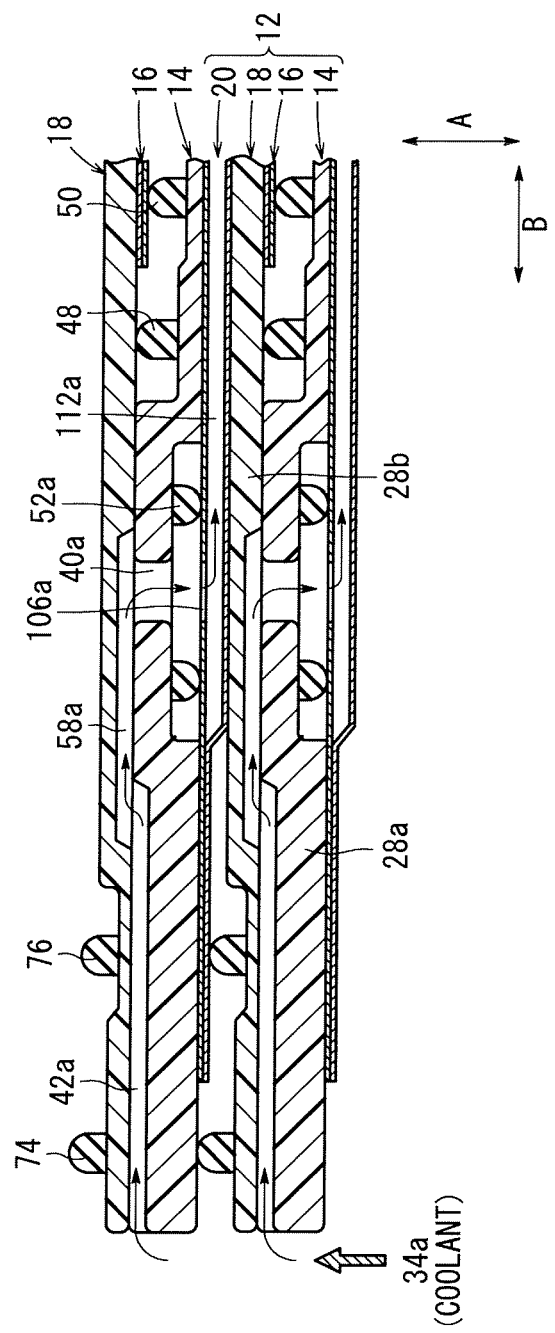
FIG. 14 is a cross sectional view showing the fuel cell, taken along a line XIV-XIV in FIG. 2.

Further, as shown in FIGS. 2 and 14, the coolant supplied to the pair of the coolant supply passages 34a partially flows into the inlet grooves 42a of the first membrane electrode assembly 14, and then, the coolant is supplied from the inlet grooves 58a to the inlet holes 40a. The coolant from the inlet holes 40a flows through the holes 106a of the second metal separator 20 into the second metal separator 20.

The coolant flows inside the second metal separator 20 along the inlet grooves 112a from both sides inwardly toward each other in the direction indicated by the arrow B, and the coolant is supplied to the coolant flow field 88. The coolant flowing from both sides toward each other inwardly collides at the center of the coolant flow field 88 in the direction indicated by the arrow B, and moves downwardly, in the direction of gravity indicated by the arrow C. Then, the coolant is distributed toward both sides in the direction indicated by the arrow B at a lower portion of the coolant flow field 88. The coolant flows from the outlet grooves 112b through the holes 106b, and the coolant is discharged from the second metal separator 20. Further, the coolant flows from the outlet holes 40b to the outlet grooves 58b, 42b, and the coolant is discharged into the coolant discharge passages 34b.

Figure 15:
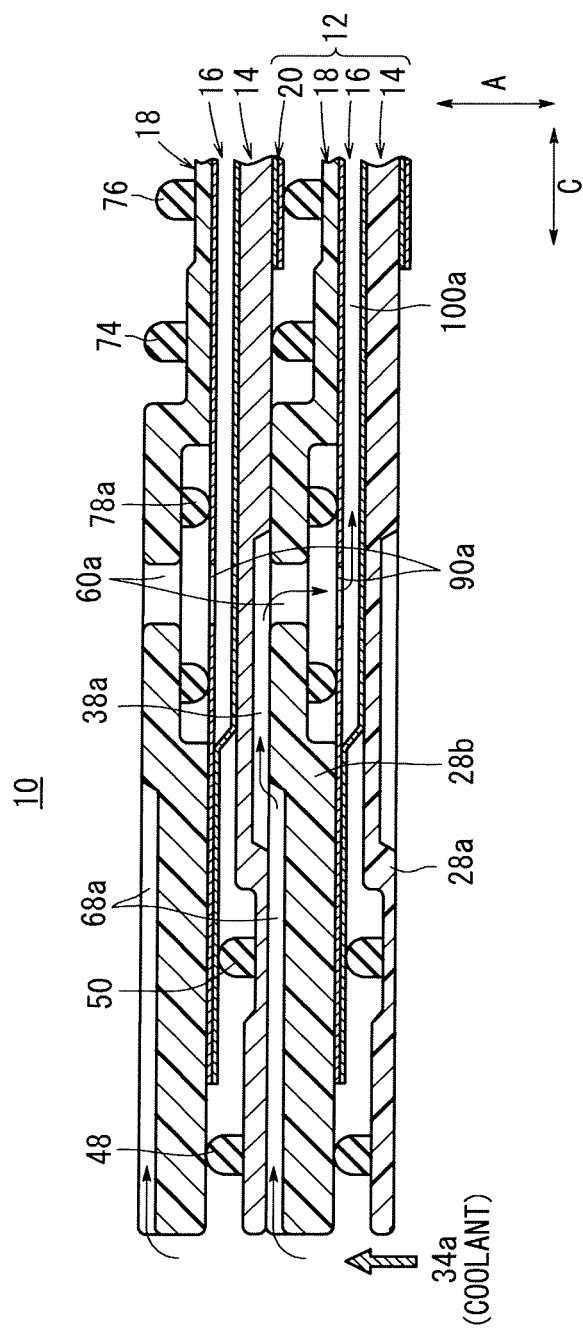
FIG. 15 is a cross sectional view showing the fuel cell, taken along a line XV-XV in FIG. 2.

In the meanwhile, as shown in FIGS. 2 and 15, the remaining coolant supplied to the coolant supply passages 34a partially flows into the inlet grooves 68a of the second membrane electrode assembly 18, and then, the coolant flows through the inlet grooves 38a to the inlet holes 60a. The coolant from the inlet holes 60a flows though the holes 90a of the first metal separator 16, and then, the coolant flows into the first metal separator 16.

The coolant flows along the inlet grooves 100a inside the first metal separator 16 in the direction indicated by the arrow B, and flows inwardly from both sides in the direction indicated by the arrow B. Then, the coolant is supplied to the coolant flow field 88. After the coolant moves along the coolant flow field 88 in the direction of gravity indicated by the arrow C, the coolant is distributed toward both sides in the direction indicated by the arrow B. The coolant flows from the outlet grooves 100b to the holes 90b, and then, the coolant is discharged from the first metal separator 16. Further, the coolant from the outlet holes 60b flows through the outlet grooves 38b, 68b and then, the coolant is discharged into the coolant discharge passages 34b.

Thus, the first membrane electrode assembly 14 and the second membrane electrode assembly 18 are cooled by the coolant flowing through the coolant flow field 88 in the first metal separator 16 and the coolant flow field 88 in the second metal separator 20.

In the first embodiment, all of the fluid passages, i.e., the oxygen-containing gas supply passage 30a, the coolant supply passages 34a, the fuel gas supply passage 32a, the oxygen-containing gas discharge passage 30b, the coolant discharge passages 34b and the fuel gas discharge passage 32b extend through the frame 28a of the first membrane electrode assembly 14 and the frame 28b of the second membrane electrode assembly 18 in the stacking direction.

In the structure, no fluid passages are required in the first metal separator 16 and the second metal separator 20. The first metal separator 16 and the second metal separator 20 can be formed into a shape having outer dimensions which correspond to the power generation area. Thus, reduction in the size and weight of the first metal separator 16 and the second metal separator 20 can be achieved easily, and it becomes possible to reduce the production cost of the first metal separator 16 and the second metal separator 20.

Accordingly, the first metal separator 16 and the second metal separator 20 can be produced efficiently, and it becomes possible to obtain the entire fuel cell 10 economically.

Further, in the first embodiment, the pairs of projections 29a1, 29a2 are provided respectively at both ends of the frame 28a in the longitudinal direction, and the pairs of projections 29b1, 29b2 are provided respectively at both ends of the frame 28b in the longitudinal direction. Accordingly, the recesses 31a, 31b are formed respectively at both ends of the frames 28a, 28b in the longitudinal direction.

Thus, as shown in FIG. 1, the tightening plates 118 are positioned in the recesses 31a, 31b, and the tightening plate 118 do not protrude outwardly from the cell units 12. In the structure, the overall size of the fuel cell 10 can be reduced easily, and the fuel cell 10 can be mounted in a vehicle conveniently.

Instead of the tightening plates 118, for example, tightening bolts, cell voltage detection terminals or the like may be placed in the recesses 31a, 31b.

Further, in the first embodiment, the coolant supply passages 34a are provided on the upper part on the upstream side of the coolant flow field 88, and the coolant discharge passages 34b are provided on the lower part on the downstream side of the coolant flow field 88. In the structure, the coolant can flow along the coolant flow field 88 smoothly and uniformly, and the uniform humidity environment can be achieved over the entire power generation areas of the first and second membrane electrode assemblies 14, 18. Accordingly, the power generation can be performed efficiently.

Figure 16:
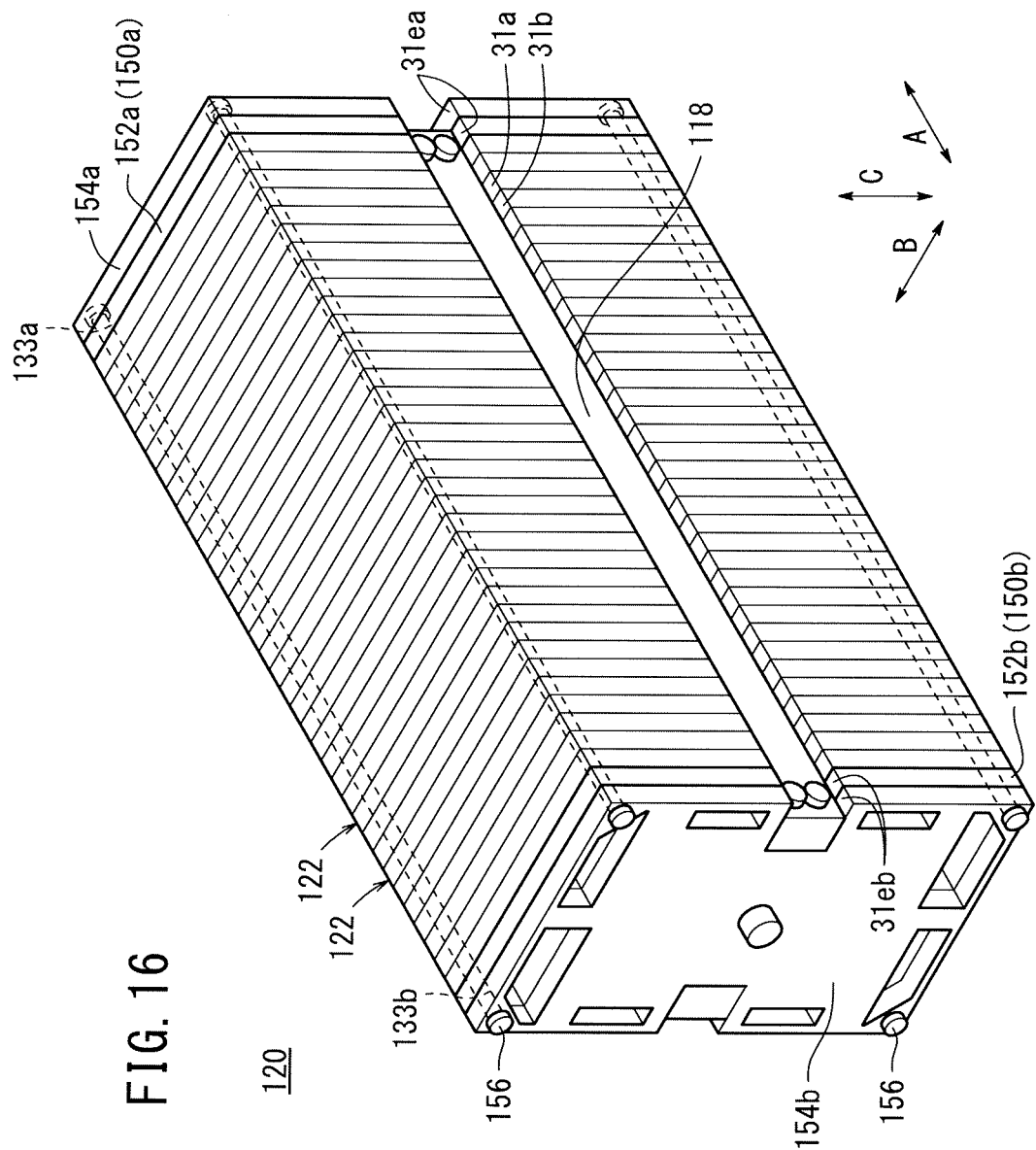
FIG. 16 is a perspective view schematically showing a fuel cell according to a second embodiment of the present invention.

As shown in FIG. 16, a fuel cell 120 according to a second embodiment of the present invention is formed by stacking a plurality of cell units 122 in a horizontal direction indicated by an arrow A.

The constituent elements of the fuel cell 120 that are identical to those of the fuel cell 10 according to the first embodiment are labeled with the same reference numeral, and description thereof will be omitted.

Figure 17:
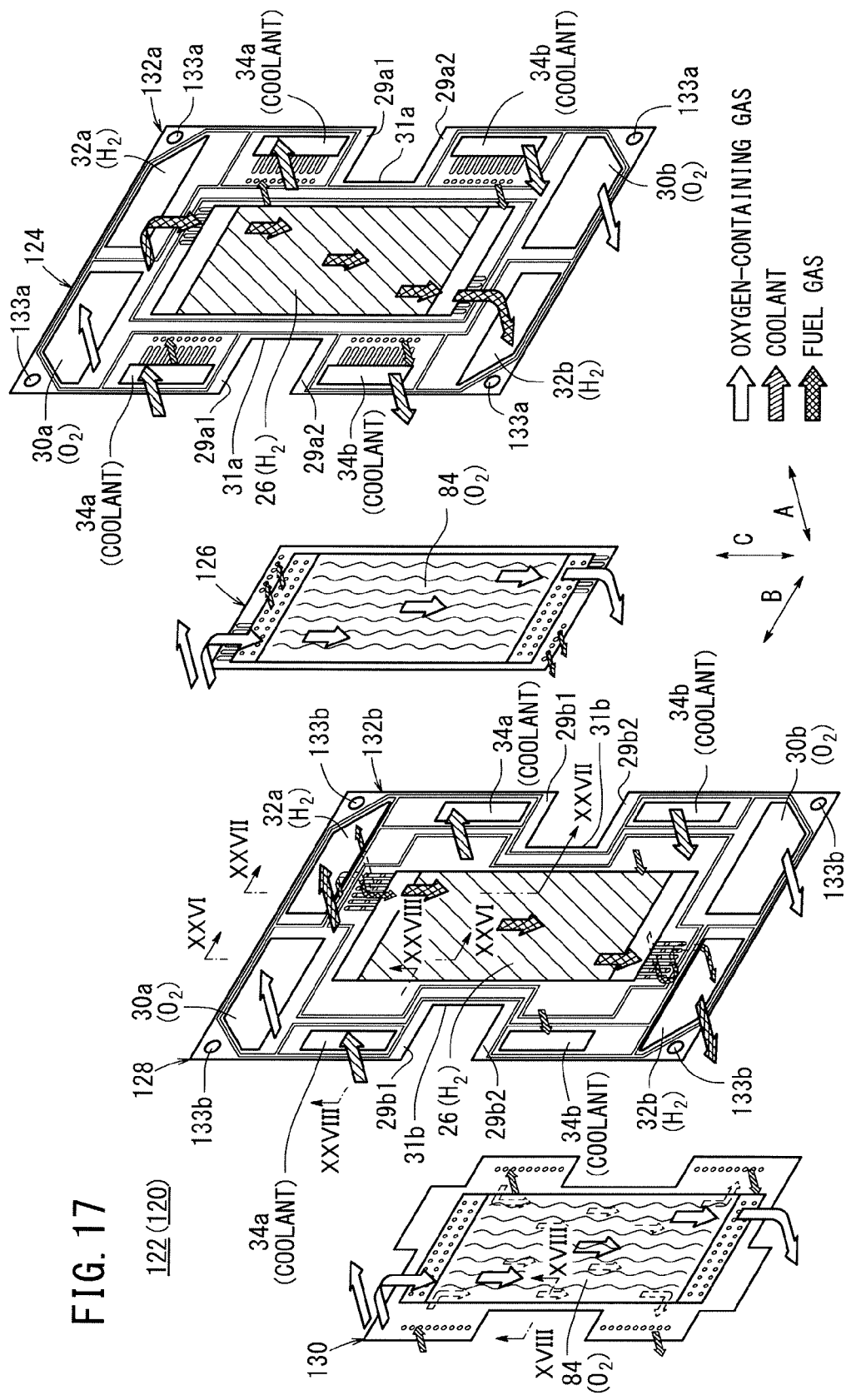
FIG. 17 is an exploded perspective view of the fuel cell.
Figure 18:
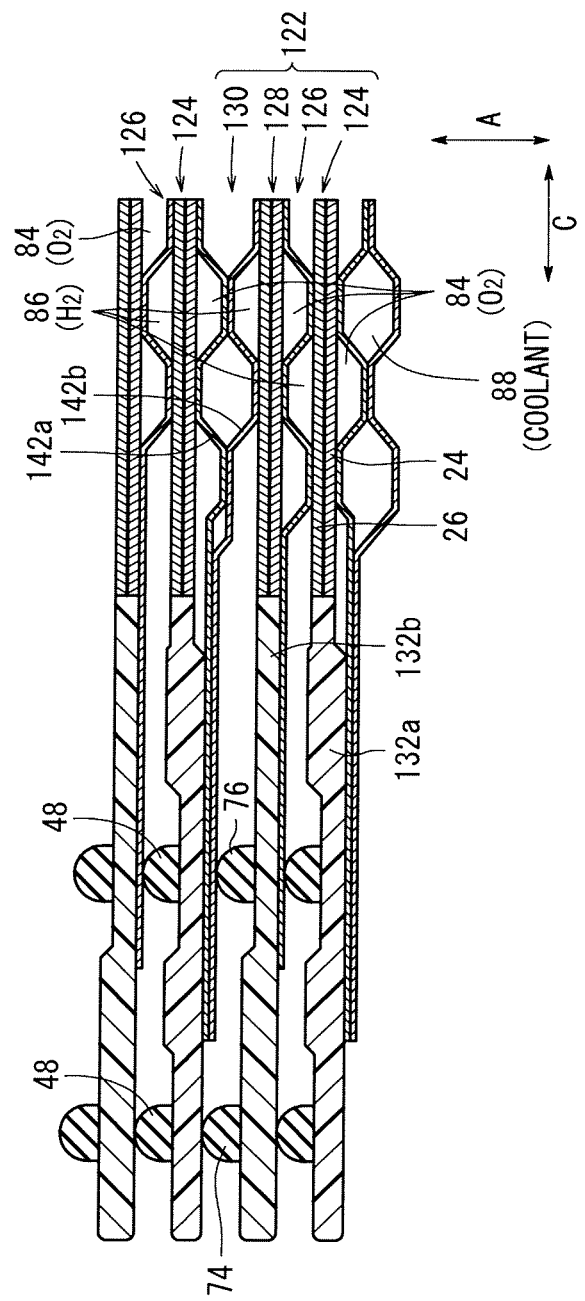
FIG. 18 is a cross sectional view showing the fuel cell, taken along a line XVIII-XVIII in FIG. 17.

As shown in FIGS. 17 and 18, each of the cell units 122 includes a first membrane electrode assembly (electrolyte electrode assembly) (MEA) 124, a first metal separator 126, a second membrane electrode assembly (electrolyte electrode assembly) (MEA) 128, and a second metal separator 130.

The first membrane electrode assembly 124 and the second membrane electrode assembly 128 include a frame (resin frame member) 132a and a frame (resin frame member) 132b, respectively. As shown in FIG. 17, bolt insertion holes 133a, 133b extend through four corners of the frames 132a, 132b in the direction indicated by the arrow A. Inclined portions are provided in the oxygen-containing gas supply passage 30a, the fuel gas supply passage 32a, the oxygen-containing gas discharge passage 30b and the fuel gas discharge passage 32b, at positions corresponding to the four corners of the frames 132a, 132b in order to provide space for the holes 133a, 133b.

Figure 19:
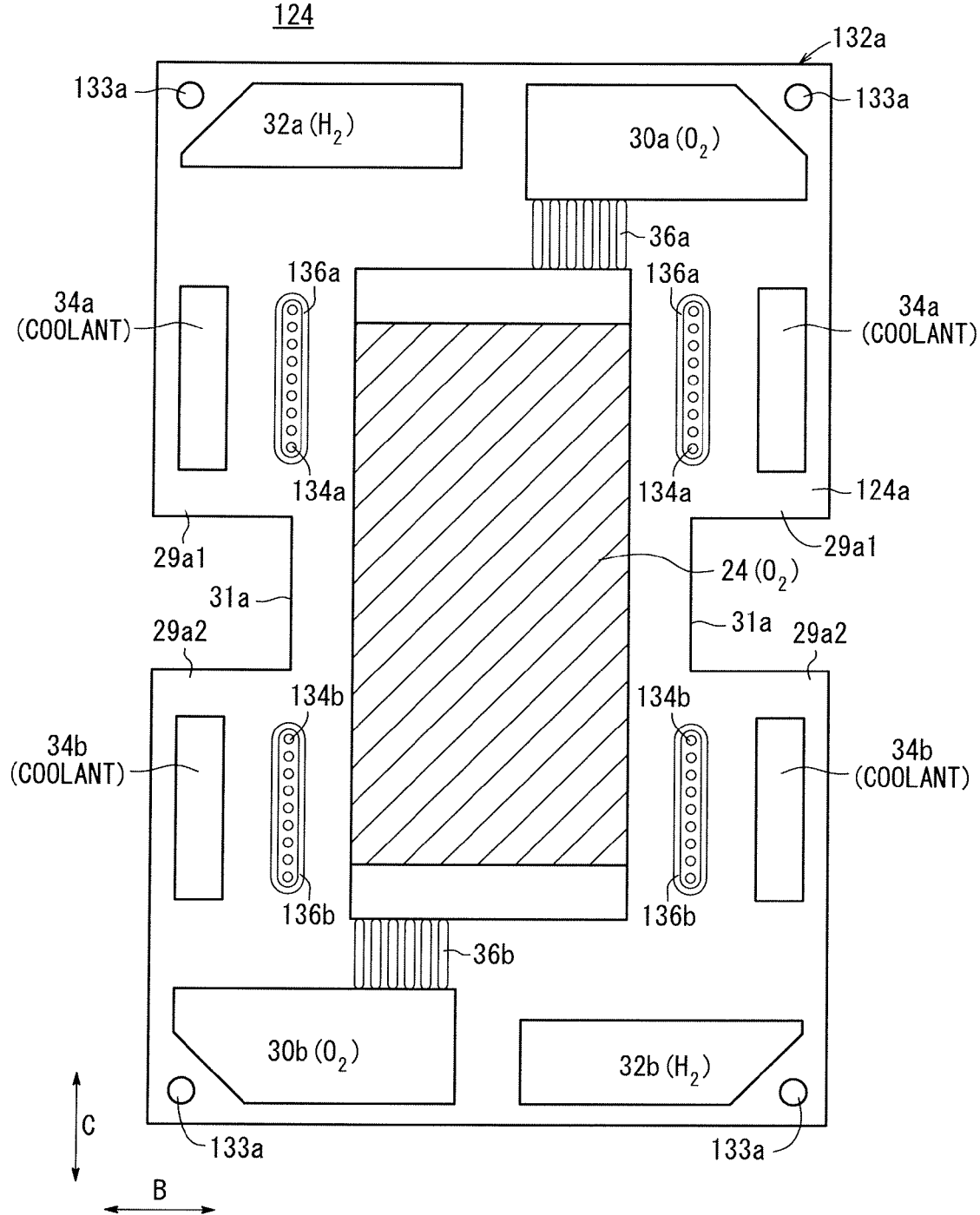
FIG. 19 is a view showing a cathode surface of the first membrane electrode assembly of the fuel cell.

As shown in FIG. 19, at upper positions on both ends of the cathode surface 124a of the frame 132a in the width direction, the inlet grooves 38a are not provided adjacent to the lower side of the coolant supply passages 34a, but a plurality of inlet holes 134a are formed along the width direction of the coolant supply passages 34a in the direction indicated by the arrow C. The inlet holes 134a are surrounded by a ring-shaped inlet seal member 136a.

At lower positions on both ends of the cathode surface 124a of the frame 132a in the width direction, the outlet grooves 38b are not provided adjacent to the upper side of the coolant discharge passages 34b, but a plurality of outlet holes 134b are formed along the width direction of the coolant discharge passages 34b indicated by the arrow C. The outlet holes 134b are surrounded by a ring-shaped outlet seal member 136b.

Figure 20:
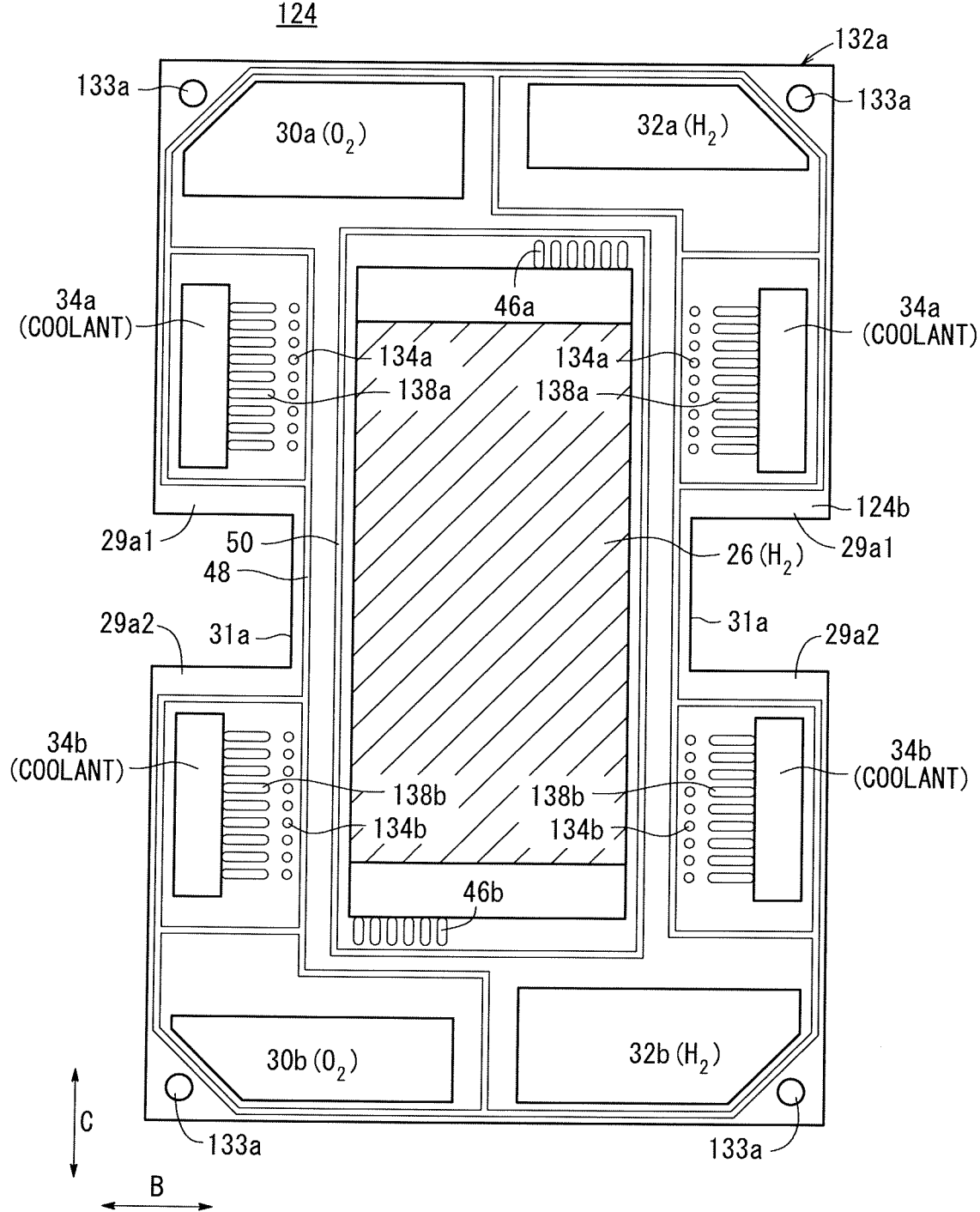
FIG. 20 is a view showing an anode surface of the first membrane electrode assembly.

As shown in FIG. 20, at upper positions on both ends of the anode surface 124b of the frame 132a in the width direction, a plurality of inlet grooves 138a corresponding to the inlet holes 134a are provided, and at lower positions on both ends of the anode surface 124b in the width direction, a plurality of outlet grooves 138b corresponding to the outlet holes 134b are provided.

Figure 21:
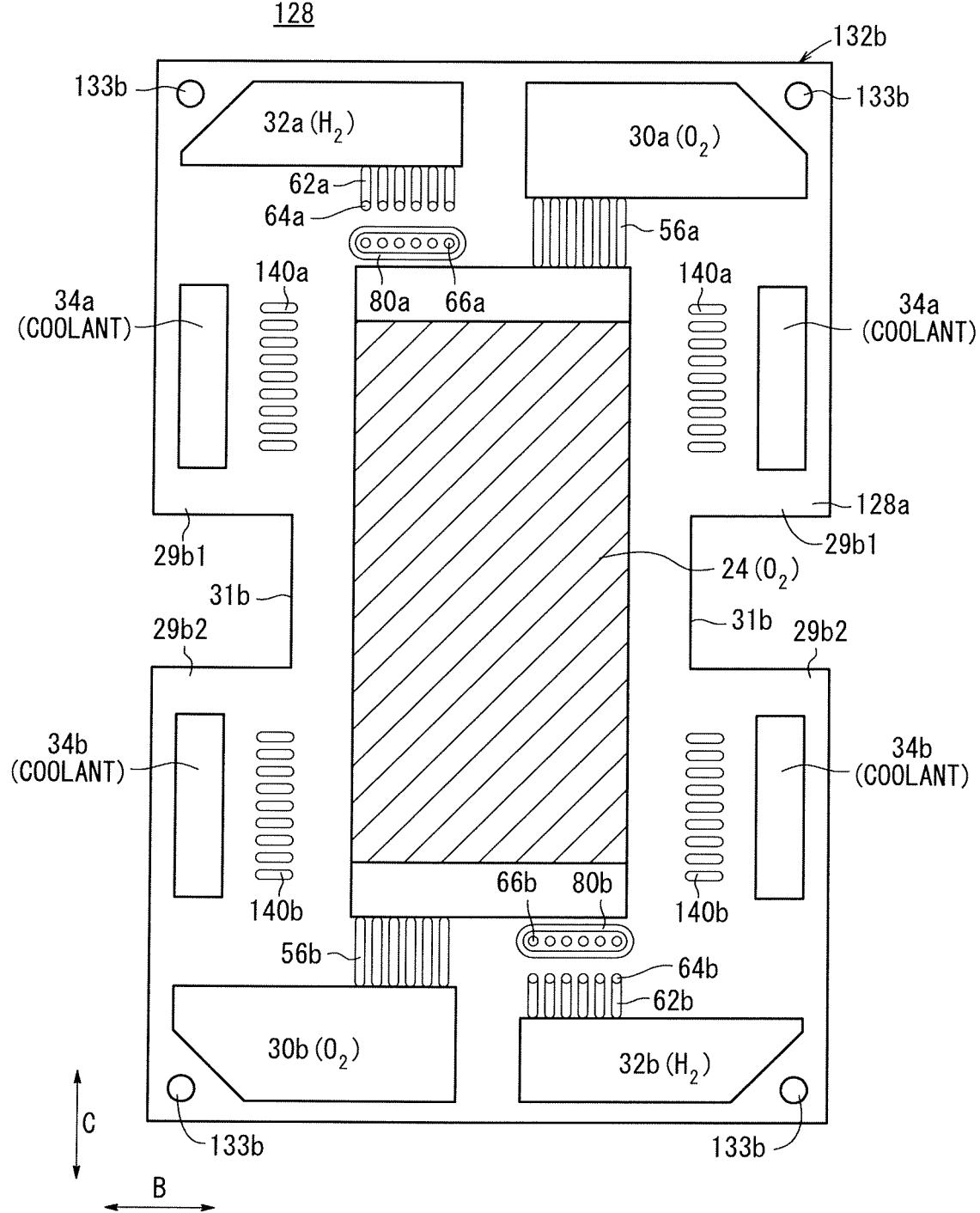
FIG. 21 is a view showing a cathode surface of a second membrane electrode assembly of the fuel cell.
Figure 22:
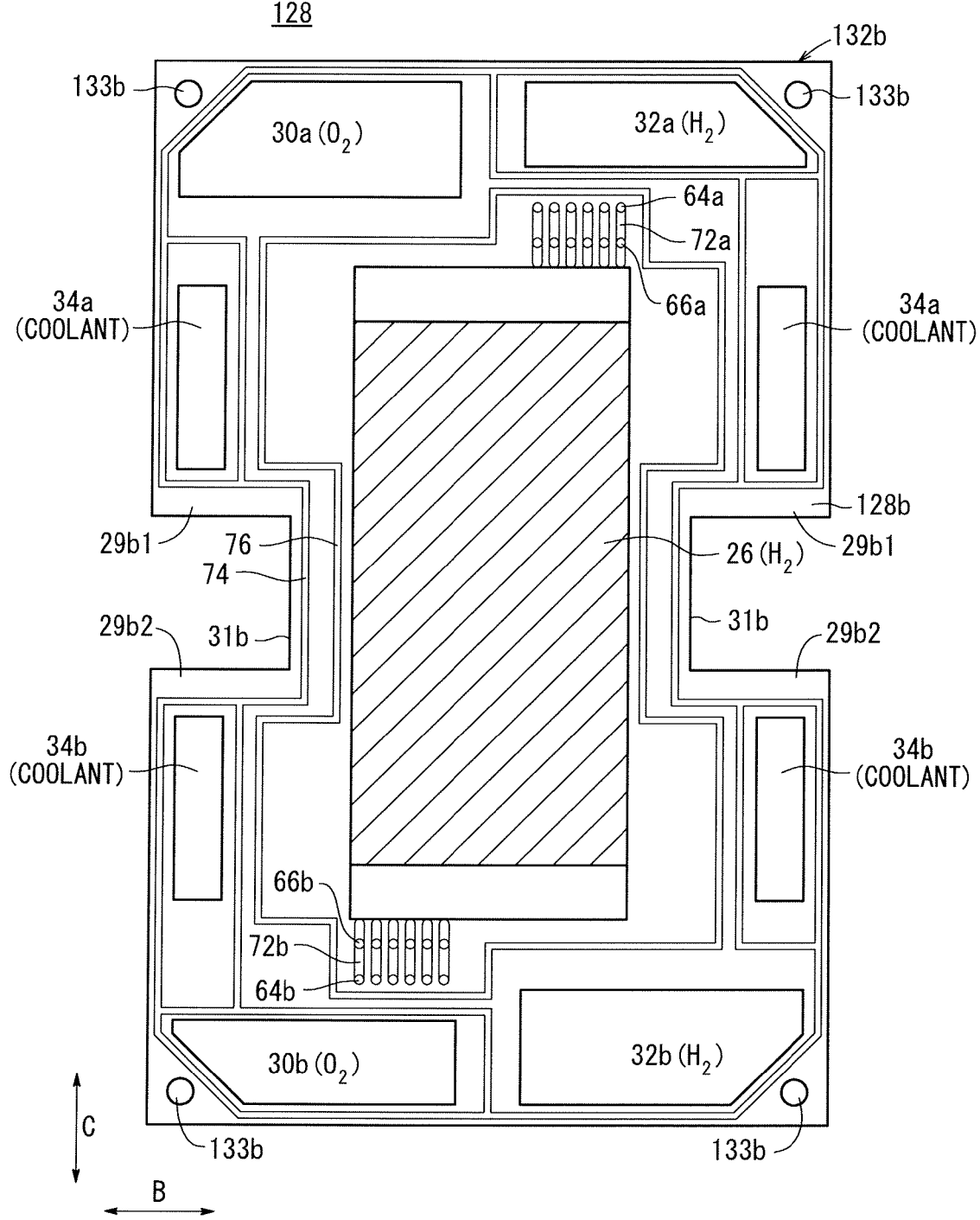
FIG. 22 is a view showing an anode surface of the second membrane electrode assembly.

As shown in FIG. 21, at upper positions on both ends of the cathode surface 128a of the frame 132b in the width direction, the inlet holes 60a are not provided adjacent to the lower side of the coolant supply passages 34a, but a plurality of inlet grooves 140a are formed along the width direction of the coolant supply passages 34a.

At lower positions on both ends of the cathode surface 128a of the frame 132b in the width direction, the outlet holes 60b are not provided adjacent to the upper side of the coolant discharge passages 34b, but a plurality of outlet grooves 140b are formed along the width direction of the coolant discharge passages 34b.

As shown in FIG. 21, the inlet grooves 68a and the outlet grooves 68b are not provided on the anode surface 128b of the frame 132b.

Figure 23:
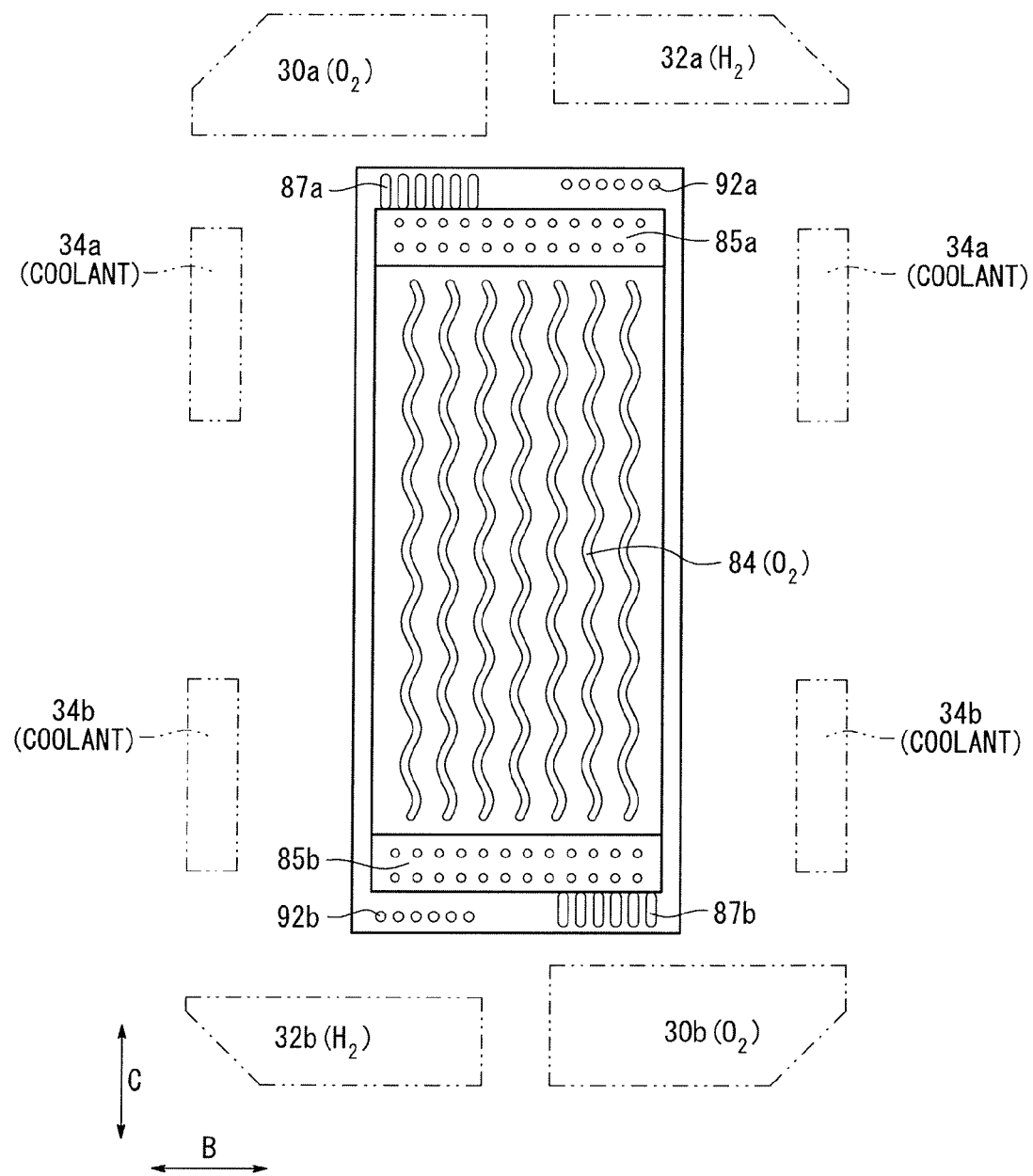
FIG. 23 is a view showing a cathode surface of a first metal separator of the fuel cell.

The first metal separator 126 is made of a single metal plate member. As shown in FIG. 23, a plurality of holes 92a and a plurality of inlet grooves 87a are formed above the oxygen-containing gas flow field 84 provided on one surface of the first metal separator 126, and a plurality of holes 92b and a plurality of outlet grooves 87b are formed below the oxygen-containing gas flow field 84.

The pair of projections 89a and the pair of projections 89b are not provided at both ends of the first metal separator 126 in the width direction, and accordingly the holes 90a, 90b are not provided.

As shown in FIG. 18, the second metal separator 130 includes two metal plates (e.g., stainless plates) 142a, 142b having the same outer shape. The metal plates 142a, 142b are stacked together. The outer circumferential edges of the metal plates 142a, 142b are welded or bonded together, and the internal space between the metal plates 142a, 142b is closed hermetically. The metal plate 142a has an oxygen-containing gas flow field 84 facing the cathode 24, and the metal plate 142b has a fuel gas flow field 86 facing the anode 26. A coolant flow field 88 is formed between the metal plates 142a, 142b.

Figure 24:
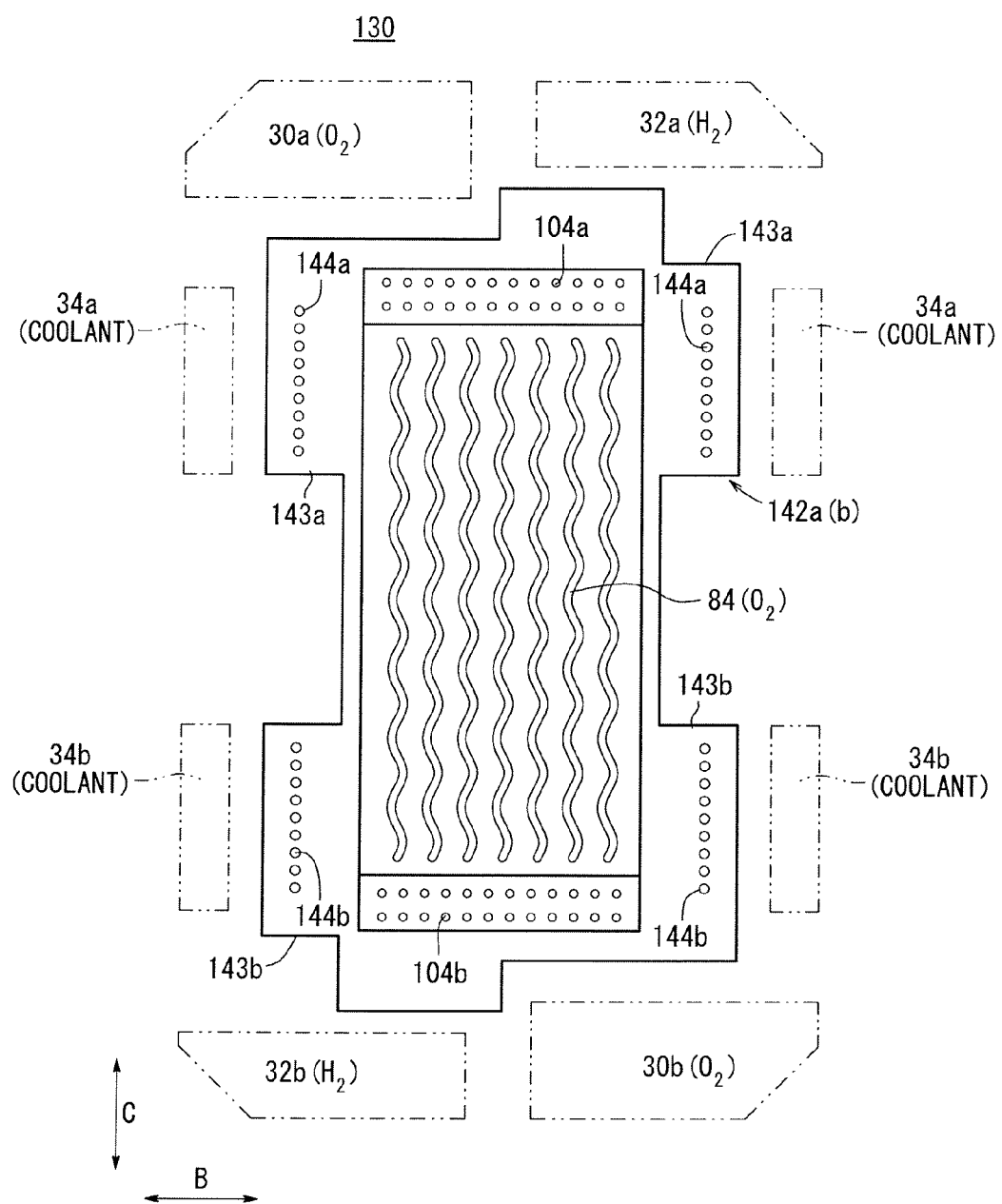
FIG. 24 is a view showing a cathode surface of a second metal separator of the fuel cell.

As shown in FIG. 24, a pair of projections 143a relatively elongated in the direction indicated by the arrow C are provided at upper positions on both ends of the metal plate 142a in the width direction. A plurality of holes 144a are formed in the projections 143a along the width direction of the coolant supply passages 34a. A pair of projections 143b relatively elongated in the direction indicated by the arrow C are provided at lower positions on both ends of the metal plate 142a in the width direction. A plurality of holes 144b are formed in the projections 143b along the width direction of the coolant discharge passages 34b.

Figure 25:
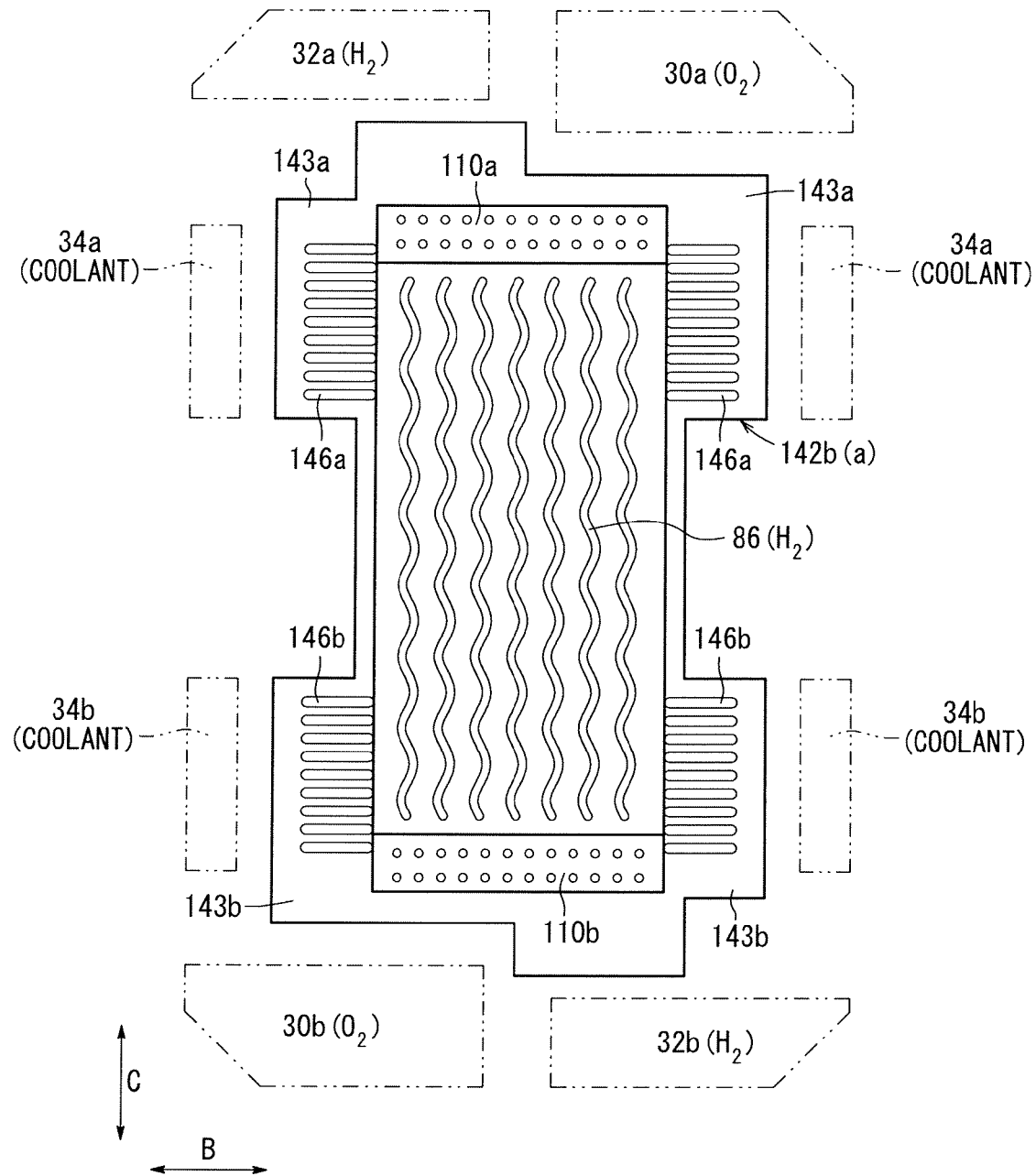
FIG. 25 is a view showing an anode surface of the second metal separator.

As shown in FIG. 25, a plurality of inlet grooves 146a are formed in the pair of projections 143a of the metal plate 142b along the width direction of the coolant supply passages 34a. A plurality of outlet grooves 146b are formed in the pair of projections 143b of the metal plate 142b along the width direction of the coolant discharge passages 34b.

As shown in FIG. 16, at one end of a plurality of cell units 122 in the stacking direction, an insulating plate 152a containing a terminal plate 150a is provided, and an end plate 154a is provided outside the insulating plate 152a. At the other end of the plurality of cell units 122 in the stacking direction, an insulating plate 152b containing a terminal plate 150b is provided, and an end plate 154b is provided outside the insulating plate 152b.

Recesses 31ea are formed on both long sides of the insulating plate 152a and the end plate 154a, and recesses 31eb are formed on both long sides of the insulating plate 152b and the end plate 154b. Holes 133a are formed at four corners of the insulating plate 152a and the end plate 154a, and holes 133b are formed at four corners of the insulating plate 152b and the end plate 154b.

In the fuel cell 120, tightening bolts 156 are inserted into the holes 133a, 133b, and a tightening force is applied to components between the end plates 154a, 154b by a plurality of (four) tightening bolts 156. Further, tightening plates 118 are placed in the recesses 31a, 31b, 31ea and 31eb, and the tightening plates 118 are fixed to the end plates 154a, 154b by screws.

Operation of the fuel cell 120 will be described briefly below.

Figure 26:
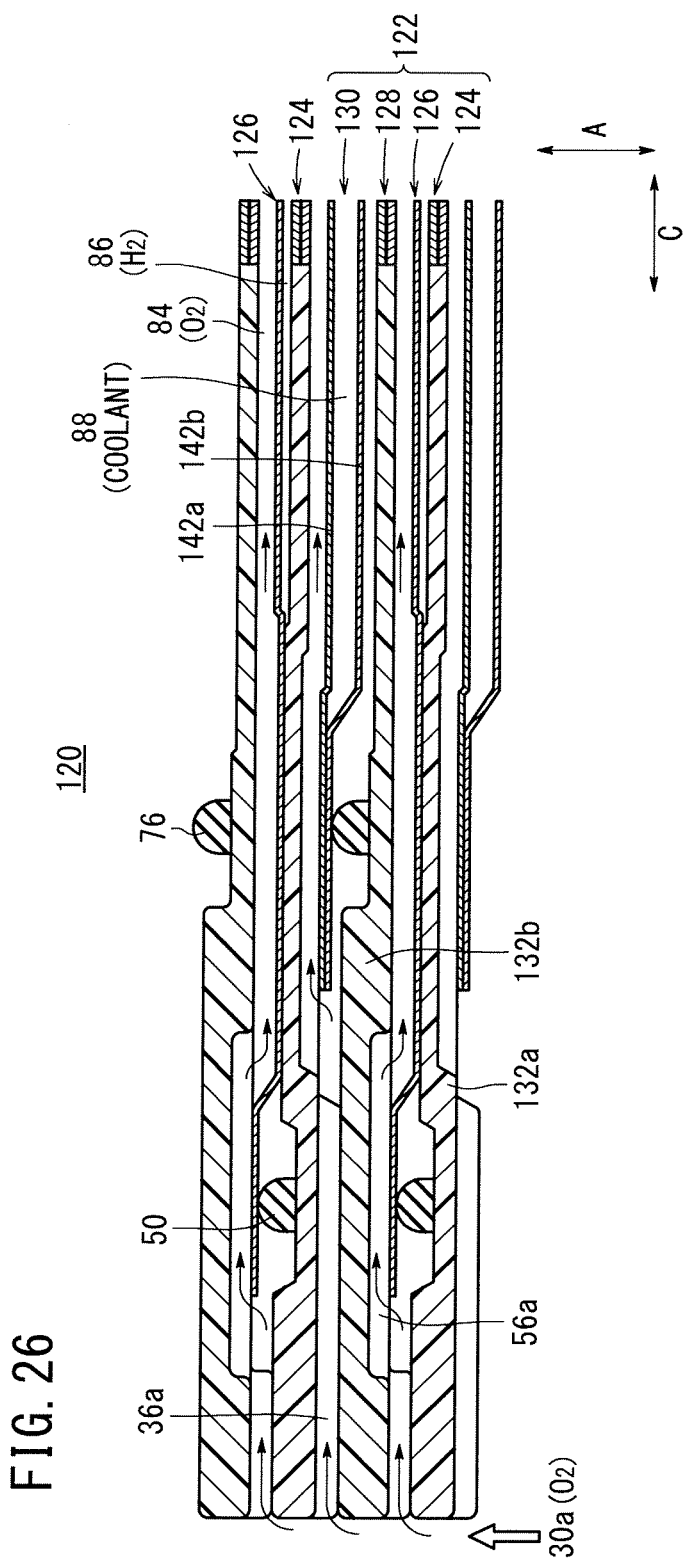
FIG. 26 is a cross sectional view showing the fuel cell, taken along a line XXVI-XXVI in FIG. 17.

In each of the cell units 122, as shown in FIGS. 17 and 26, the oxygen-containing gas supplied to the oxygen-containing gas supply passage 30a flows into the inlet grooves 36a of the first membrane electrode assembly 124 and the inlet grooves 56a of the second membrane electrode assembly 128.

The oxygen-containing gas is supplied from the inlet grooves 36a to the oxygen-containing gas flow field 84 of the second metal separator 130. Then, the oxygen-containing gas is supplied from the oxygen-containing gas flow field 84 to the cathode 24 of the first membrane electrode assembly 124. The remaining oxygen-containing gas after consumption in the power generation reaction is discharged through the outlet grooves 36b into the oxygen-containing gas discharge passage 30b.

The oxygen-containing gas supplied to the inlet grooves 56a flows through the inlet grooves 87a between the second membrane electrode assembly 128 and the first metal separator 126, and the oxygen-containing gas is supplied into the oxygen-containing gas flow field 84 of the first metal separator 126. The oxygen-containing gas is supplied from the oxygen-containing gas flow field 84 to the cathode 24 of the second membrane electrode assembly 128. The remaining oxygen-containing gas after consumption in the power generation reaction is discharged through the outlet grooves 87b, 56b into the oxygen-containing gas discharge passage 30b.

Figure 27:
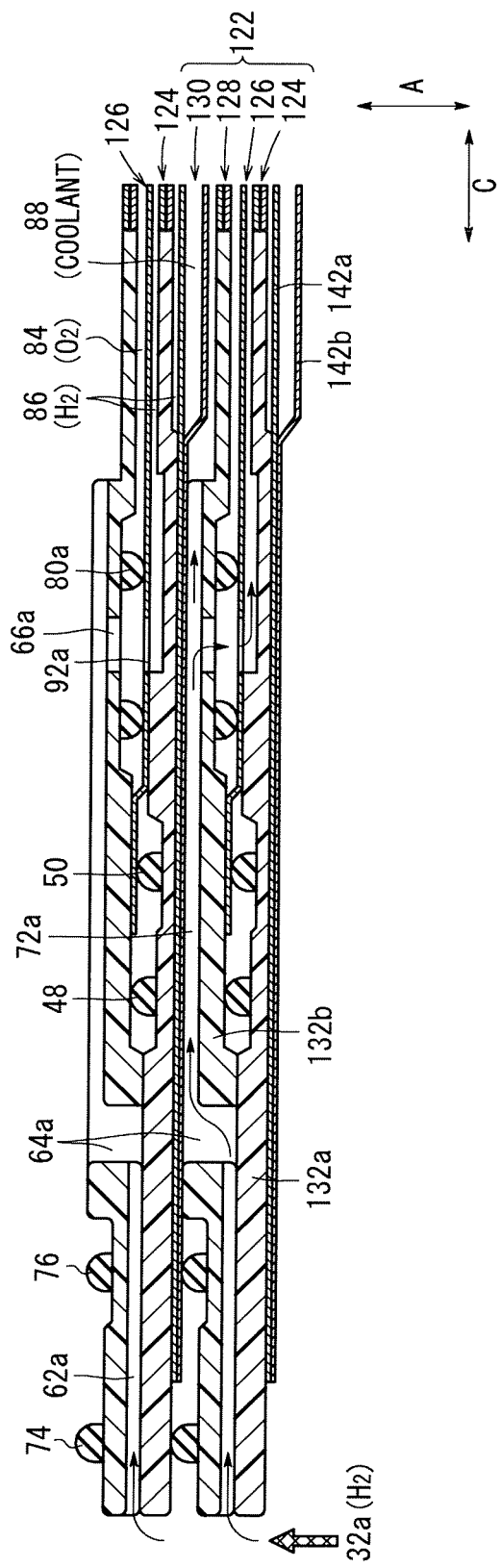
FIG. 27 is a cross sectional view showing the fuel cell, taken along a line XXVII-XXVII in FIG. 17.

Further, as shown in FIGS. 17 and 27, the fuel gas supplied to the fuel gas supply passage 32a flows into the inlet grooves 62a at the cathode 24 of the second membrane electrode assembly 128. The fuel gas from the inlet grooves 62a flows through the inlet holes 64a toward the anode 26, and part of the fuel gas is supplied from the inlet grooves 72a to the fuel gas flow field 86 of the second metal separator 130.

The remaining fuel gas flows through the inlet holes 66a and the holes 92a of the first metal separator 126, and then, the fuel gas flows into between the first metal separator 126 and the first membrane electrode assembly 124, and the fuel gas is supplied to the fuel gas flow field 86 of the first metal separator 126.

The fuel gas that has been consumed in the power generation reaction in the fuel gas flow field 86 of the second metal separator 130 is discharged into the outlet grooves 72b. Then, the fuel gas flows from the outlet holes 64b, and the fuel gas is discharged through the outlet grooves 62b into the fuel gas discharge passage 32b. In the meanwhile, the fuel gas that has been consumed in the power generation reaction in the fuel gas flow field 86 of the first metal separator 126 flows from the holes 92b and then the fuel gas is discharged through the outlet holes 66b into the outlet grooves 72b. Likewise, the fuel gas is discharged into the fuel gas discharge passage 32b.

Thus, in the first membrane electrode assembly 124 and the second membrane electrode assembly 128, the oxygen-containing gas supplied to the cathode 24 and the fuel gas supplied to the anode 26 are consumed in electrochemical reactions at catalyst layers of the cathode 24 and the anode 26 for generating electricity.

Figure 28:
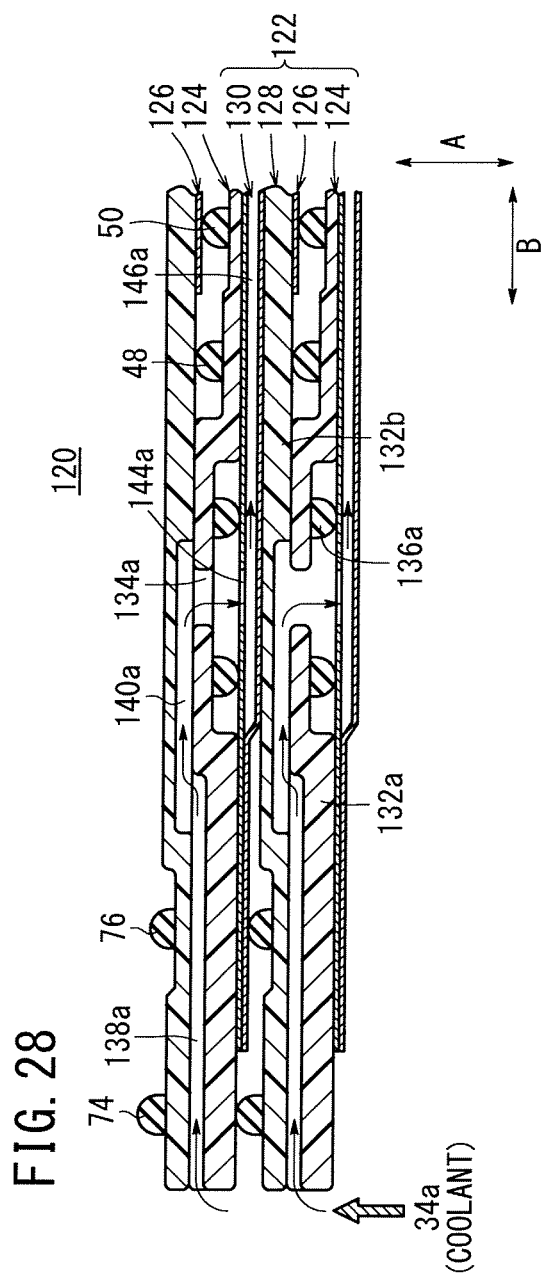
FIG. 28 is a cross sectional view showing the fuel cell, taken along a line XXVIII-XXVIII in FIG. 17.
Figure 29:
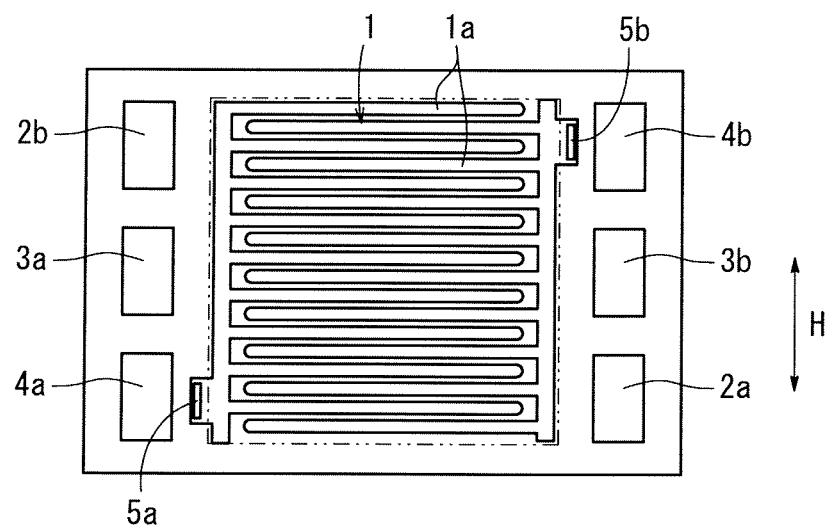
FIG. 29 is a view showing an anode separator of a fuel cell disclosed in Japanese Laid-Open Patent Publication No. 2011-018525.

Further, as shown in FIGS. 17 and 28, the coolant supplied to the pair of coolant supply passages 34a flows into the inlet grooves 138a of the first membrane electrode assembly 124, and then the coolant is supplied from the inlet grooves 140a to the inlet holes 134a. The coolant from the inlet holes 134a flows through the holes 144a of the second metal separator 130, into the second metal separator 130.

The coolant flows inside the second metal separator 130 along the inlet grooves 146a inwardly from both sides in the direction indicated by the arrow B, and then, the coolant is supplied to the coolant flow field 88. The coolant flowing inwardly from both sides collides at a central portion of the coolant flow field 88 in the direction indicated by the arrow B. After the coolant moves in the direction of gravity, the coolant is distributed toward both sides in the direction indicated by the arrow B at a lower portion of the coolant flow field 88. The coolant flows from the outlet grooves 146b through the holes 144b, and then, the coolant is discharged from the second metal separator 130. The coolant flows from the outlet holes 134b through the outlet grooves 140b, 138b, and then, the coolant is discharged into the coolant discharge passage 34b.

In the structure, the first membrane electrode assembly 124 and the second membrane electrode assembly 128 are cooled by skip cooling by the coolant flowing through the coolant flow field 88 of the second metal separator 130.

In the second embodiment, the same advantages as in the case of the first embodiment are obtained. For example, reduction in the size and weight of the first metal separator 126 and the second metal separator 130 is achieved easily, the production cost is reduced effectively, and it becomes possible to produce the fuel cell 120 economically as a whole.

Further, the tightening plates 118 are placed in the recesses 31a, 31b. The tightening plates 118 have a load receiving function for receiving an external load applied to the cell units 122 in the longitudinal direction. It is because the tightening bolts 156 have the function of tightening the fuel cell 120.

While the invention has been particularly shown and described with reference to preferred embodiments, it will be understood that variations and modifications can be effected thereto by those skilled in the art without departing from the spirit of the invention as defined by the appended claims.

What is claimed is:

1. A fuel cell formed by stacking a rectangular electrolyte electrode assembly and a metal separator in a stacking direction, the electrolyte electrode assembly including a pair of electrodes and an electrolyte interposed between the electrodes, wherein:

the rectangular electrolyte electrode assembly has a longer side extending in a longitudinal direction and a shorter side extending in a lateral direction;

a resin frame member is formed integrally with an outer circumference of the electrolyte electrode assembly, the resin frame member having a substantially rectangular outline shape including a pair of opposed shorter sides having edge portions which are substantially flat and uninterrupted, and also including a pair of longer sides;

a plurality of fluid passages including a reactant gas supply passage, a reactant gas discharge passage, a pair of coolant supply passages and a pair of coolant discharge passages extend through the resin frame member in the stacking direction, said fluid passages situated outside of and spaced apart from the metal separator;

a pair of lateral projections are provided at each end of the resin frame member in the longitudinal direction, and the projections protrude toward both sides in the lateral direction;

a width of the metal separator in the lateral direction is less than the maximum width of the resin frame member measured at the projections;

the resin frame member has a rectangular recess defined in each of two opposite lateral sides thereof between said projections;

the coolant supply passages are formed in the projections at one end of the resin frame member in the longitudinal direction, and the coolant discharge passages are formed in the projections at the other end thereof in the longitudinal direction, whereby the coolant supply and discharge passages are formed in the longer sides of the resin frame member;

the reactant gas supply passage and the reactant gas discharge passage are situated only at respective ends of the resin frame member in the longitudinal direction, and the coolant supply passages and the coolant discharge passages are situated closer to the rectangular recess than the reactant gas supply passage and the reactant gas discharge passage; and in the resin frame member, a first plate member having a rectangular cross-sectional shape and extending in the stacking direction is provided in the rectangular recess between the pair of lateral projections at one side of the resin frame member, and a second plate member having a rectangular cross-sectional shape and extending in the stacking direction is provided in the rectangular recess between the pair of lateral projections at the other side of the resin frame member.

2. The fuel cell according to claim 1, wherein the coolant supply and discharge passages are formed in areas of the projections proximate the recesses.

3. A fuel cell stack comprising:

a plurality of fuel cells arranged in a stacking direction;

a first insulating plate at a first end of the plurality of fuel cells, and a second insulating plate at a second end of the plurality of fuel cells; and a first end plate outside of the first insulating plate and a second end plate outside of the second insulating plate;

wherein each of the fuel cells comprises:

a plurality of rectangular electrolyte electrode assemblies and a plurality of metal separators arranged in the stacking direction, each of said electrolyte electrode assemblies including a pair of electrodes and an electrolyte interposed between the electrodes, wherein:

the rectangular electrolyte electrode assembly has a longer side extending in a longitudinal direction and a shorter side extending in a lateral direction;

a resin frame member is formed integrally with an outer circumference of each of said electrolyte electrode assemblies, the resin frame member having a substantially rectangular outline shape including a pair of opposed shorter sides having edge portions which are substantially flat and uninterrupted, and also including a pair of longer sides;

a plurality of fluid passages including a reactant gas supply passage, a reactant gas discharge passage, a pair of coolant supply passages and a pair of coolant discharge passages extend through the resin frame member in the stacking direction, said fluid passages situated outside of and spaced apart from the metal separator;

a pair of lateral projections are provided at each end of the resin frame member in the longitudinal direction, and the projections protrude toward both sides in the lateral direction;

a width of the metal separator in the lateral direction is less than the maximum width of the resin frame member measured at the projections;

the resin frame member has a rectangular recess defined in each of two opposite lateral sides thereof between said projections;

the coolant supply passages are formed in the projections at one end of the resin frame member in the longitudinal direction, and the coolant discharge passages are formed in the projections at the other end thereof in the longitudinal direction, whereby the coolant supply and discharge passages are formed in the longer sides of the resin frame member;

the reactant gas supply passage and the reactant gas discharge passage are situated only at respective ends of the resin frame member in the longitudinal direction, and the coolant supply passages and the coolant discharge passages are situated closer to the rectangular recess than the reactant gas supply passage and the reactant gas discharge passage; and in the resin frame member, a first plate member having a rectangular cross-sectional shape and extending in the stacking direction is provided in the rectangular recess between the pair of lateral projections at one side of the resin frame member, and a second plate member having a rectangular cross-sectional shape and extending in the stacking direction is provided in the rectangular recess between the pair of lateral projections at the other side of the resin frame member.

4. The fuel cell of claim 1, wherein outer surfaces of the plate members are recessed in relation to the outer surfaces of the resin frame members.

5. The fuel cell stack of claim 3, wherein holes are formed at four corners of each of the insulating plates and the end plates, and further comprising bolts inserted into the holes of the insulating plates and the end plates.

6. The fuel cell stack of claim 5, wherein outer surfaces of the plate members are recessed in relation to the outer surfaces of the resin frame members.

7. The fuel cell stack of claim 3, further comprising threaded fasteners attaching the first and second plate members to the end plates.

8. The fuel cell stack of claim 7, wherein head portions of the fasteners are recessed in relation to outer edge portions of the longer sides of the resin frame members.

* * * * *